(12) United States Patent
Li et al.

(10) Patent No.: US 11,934,505 B2
(45) Date of Patent: *Mar. 19, 2024

(54) INFORMATION CONTENT VIEWING METHOD AND TERMINAL

(71) Applicant: Huawei Technologies Co., Ltd., Shenzhen (CN)

(72) Inventors: Zhan Li, Shenzhen (CN); Changkuan Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/889,803

(22) Filed: Aug. 17, 2022

(65) Prior Publication Data

US 2023/0039353 A1 Feb. 9, 2023

Related U.S. Application Data

(63) Continuation of application No. 17/059,798, filed as application No. PCT/CN2018/089664 on Jun. 1, 2018, now Pat. No. 11,468,154.

(51) Int. Cl.
*G06F 3/04817* (2022.01)
*G06F 3/0488* (2022.01)
(Continued)

(52) U.S. Cl.
CPC .......... *G06F 21/32* (2013.01); *G06F 3/04817* (2013.01); *G06F 3/0488* (2013.01); *G06V 40/1365* (2022.01); *G06V 40/63* (2022.01); *H04M 1/72436* (2021.01); *H04M 1/72463* (2021.01); *H04M 1/724631* (2022.02); *G06F 2221/2139* (2013.01); *H04M 2201/42* (2013.01)

(58) Field of Classification Search
None
See application file for complete search history.

(56) References Cited

U.S. PATENT DOCUMENTS 11,003,325 B2    5/2021  Ku et al.
11,089,148 B2    8/2021  Xu et al.
(Continued)

FOREIGN PATENT DOCUMENTS

CN    105025146 A    11/2015
CN    105760737 A     7/2016
(Continued)

*Primary Examiner* — William L Bashore
*Assistant Examiner* — Gabriel Mercado
(74) *Attorney, Agent, or Firm* — Conley Rose, P.C.

(57) ABSTRACT

An information content viewing method includes displaying, by a terminal, a first lock screen or keeps in a screen-off state, and displaying, by the terminal, a second lock screen after receiving first information, where the second lock screen displays a first control, and the first control prompts that content of the first information is hidden, receiving, by the terminal, a first operation of a user on a touchscreen, and collecting and verifying, by the terminal, fingerprint information of the user based on the first operation and displaying, by the terminal, a third lock screen after the verification on the fingerprint information succeeds, where the third lock screen displays the first control, and the first control displays the content of the first information.

20 Claims, 32 Drawing Sheets

(51) Int. Cl.
*G06F 21/32* (2013.01)
*G06V 40/12* (2022.01)
*G06V 40/60* (2022.01)
*H04M 1/72436* (2021.01)
*H04M 1/72463* (2021.01)

(56) References Cited

U.S. PATENT DOCUMENTS

| | | | |
|---|---|---|---|
| 11,468,154 B2 * | 10/2022 | Li | H04M 1/724634 |
| 2008/0317302 A1 | 12/2008 | Abdallah et al. | |
| 2012/0159599 A1 | 6/2012 | Szoke et al. | |
| 2014/0337053 A1 * | 11/2014 | Smith | H04L 63/0815 |
| | | | 705/3 |
| 2015/0074615 A1 | 3/2015 | Han et al. | |
| 2015/0089666 A1 | 3/2015 | Lee et al. | |
| 2015/0269370 A1 | 9/2015 | Phillips et al. | |
| 2015/0355829 A1 * | 12/2015 | Feri | H05B 47/155 |
| | | | 715/771 |
| 2015/0355839 A1 | 12/2015 | Feri et al. | |
| 2016/0086241 A1 * | 3/2016 | Proulx | G06F 3/0481 |
| | | | 705/26.4 |
| 2016/0364600 A1 | 12/2016 | Shah et al. | |
| 2018/0234496 A1 * | 8/2018 | Ratias | A63F 13/60 |
| 2019/0065777 A1 * | 2/2019 | Ravuvari | H04W 12/02 |

FOREIGN PATENT DOCUMENTS

| | | |
|---|---|---|
| CN | 105893826 A | 8/2016 |
| CN | 106228053 A | 12/2016 |
| CN | 106534572 A | 3/2017 |
| CN | 106650374 A | 5/2017 |
| CN | 106791051 A | 5/2017 |
| CN | 106815502 A | 6/2017 |
| CN | 106843697 A | 6/2017 |
| CN | 106936973 A | 7/2017 |
| CN | 107368721 A | 11/2017 |
| CN | 107450799 A | 12/2017 |
| CN | 107944240 A | 4/2018 |

* cited by examiner

CONT.
FROM

INFORMATION CONTENT VIEWING METHOD AND TERMINAL

CROSS-REFERENCE TO RELATED APPLICATIONS

This is a continuation of U.S. patent application Ser. No. 17/059,798 filed on Nov. 30, 2020, which is a U.S. National Stage of International Patent Application No. PCT/CN2018/089664 filed on Jun. 1, 2018. Both of the aforementioned applications are hereby incorporated by reference in their entireties.

TECHNICAL FIELD

This application relates to the field of communications technologies, and in particular, to an information content viewing method and a terminal.

BACKGROUND

When using a mobile phone, a user pays more attention on protection of personal information, especially privacy information. Usually, content related to the privacy information is hidden to prevent the content from being viewed by another person. In this case, the hidden privacy information is hidden information. For example, the user may set a new message pushed by an application to a hidden state. In this way, if the mobile phone is in a screen-locked state, when a new message is received, a screen of the mobile phone is turned on, and displays a prompt that the user receives the new message, but content of the new message is hidden. In this way, the mobile phone can prompt the user to view the new message in a timely manner, and can prevent another person from viewing the content of the new message. This helps ensure privacy of the user.

However, it should be noted that, when the user views the content of the hidden information, the user needs to perform relatively complex operations, resulting in poor user experience. For example, in the screen-locked state, when the mobile phone receives the new message, and the content of the new message is hidden, the user needs to first unlock the screen, and then tap a control of the new message, to enable the mobile phone to enter a screen of an application (for example, "Messaging" or "WeChat") to which the new message belongs, to view the content of the new message.

SUMMARY

This application provides an information content viewing method and a terminal, to simplify operations of a user for viewing hidden information content, so as to improve efficiency of interaction between the user and a terminal, and improve user experience.

According to a first aspect, a method provided in this application is applied to a terminal, the terminal includes a touchscreen, at least one fingerprint sensor is disposed on the touchscreen, and the method includes: displaying, by the terminal, a first lock screen or keeping in a screen-off state; receiving, by the terminal, first information; displaying, by the terminal, a second lock screen, where the second lock screen displays a first control, and the first control prompts that content of the first information is hidden; receiving, by the terminal, a first operation of a user on the touchscreen, where the first operation is a preset operation used to instruct the terminal to display the content of the first information; collecting, by the terminal, fingerprint information of the user by using the at least one fingerprint sensor in response to the first operation; and displaying, by the terminal, a third lock screen in response to a fact that verification on the collected fingerprint information succeeds, where the third lock screen displays the first control, and the first control displays the content of the first information.

It can be learned that the terminal collects the fingerprint information of the user based on the first operation of the user on the touchscreen, to perform identity verification on the user, and further instructs the terminal to display the content of the first information after the verification succeeds. In this way, user operations are simplified, efficiency of interaction between the user and the terminal is improved, and user experience is improved.

In some possible implementations, that the first control prompts that content of the first information is hidden includes: the first control displays preset content instead of the content of the first information, and the preset content is different from the content of the first information; or the first control displays prompt information, to prompt that the content of the first information is hidden. Therefore, a plurality of hiding manners are provided. This helps improve user experience.

In some possible implementations, before the displaying, by the terminal, a second lock screen, the method further includes: determining, by the terminal based on the first information, that the first information meets a preset condition, where the preset condition is any one or more of the following: the first information is pushed by a preset application, a sending party of the first information is a preset contact, the first information is received by the terminal within a preset time period, and the first information is received by the terminal at a preset location. Therefore, different preset conditions may be set based on different hiding requirements of the user. This helps improve user experience.

In some possible implementations, the second lock screen further displays a first fingerprint icon, the first fingerprint icon corresponds to the first control, a display location of the first fingerprint icon partially overlaps a display location of the first control, and a fingerprint sensor is disposed at the display location of the first fingerprint icon. The receiving, by the terminal, a first operation of a user on the touchscreen is specifically: receiving, by the terminal, the first operation of the user at the display location of the first fingerprint icon. The collecting, by the terminal, fingerprint information of the user by using the at least one fingerprint sensor in response to the first operation is specifically: collecting, by the terminal, the fingerprint information of the user by using the fingerprint sensor at the display location of the first fingerprint icon in response to the first operation. It can be learned that the fingerprint icon may be used to prompt the user. This helps improve user experience.

In some possible implementations, the second lock screen further displays a second control and a second fingerprint icon, the second control prompts that content of second information is hidden, the second fingerprint icon corresponds to the second control, a display location of the second fingerprint icon partially overlaps a display location of the second control, and a fingerprint sensor is disposed at the display location of the second fingerprint icon. It can be learned that different information may correspond to different fingerprint icons. This helps separately perform authentication on different information, and helps ensure information security and privacy.

In some possible implementations, the displaying, by the terminal, a third lock screen, where the third lock screen displays the first control, and the first control displays the content of the first information is specifically: displaying, by the terminal, the third lock screen, where the third lock screen displays the first control and the second control, the first control displays the content of the first information, and the second control prompts that the content of the second information is hidden.

In some possible implementations, after the displaying, by the terminal, the third lock screen, the method further includes: receiving, by the terminal, a second operation of the user at the display location of the second fingerprint icon; collecting, by the terminal, fingerprint information of the user by using the fingerprint sensor at the display location of the second fingerprint icon in response to the second operation; and displaying, by the terminal, a fourth lock screen in response to a fact that verification on the collected fingerprint information succeeds, where the fourth lock screen displays the first control and the second control, the first control displays the content of the first information, and the second control displays the content of the second information.

In some possible implementations, the second lock screen further displays a third control, the third control prompts that content of third information is hidden, the first fingerprint icon corresponds to the first control and the second third control, and the display location of the first fingerprint icon partially overlaps a display location of the third control.

The displaying, by the terminal, a third lock screen, where the third lock screen displays the first control, and the first control displays the content of the first information is specifically: displaying, by the terminal, the third lock screen, where the third lock screen displays the first control and the third control, the first control displays the content of the first information, and the third control displays the content of the third information.

It can be learned that different information may use a same fingerprint icon. To be specific, a plurality of pieces of hidden information can be viewed by performing authentication once. This simplifies user operations, improves efficiency of using the terminal by the user, and improves user experience.

In some possible implementations, the displaying, by the terminal, a second lock screen, where the second lock screen displays a first control, and the first control prompts that content of the first information is hidden is specifically: displaying, by the terminal, the second lock screen, where the second lock screen displays the first control, the first control displays prompt information, and the prompt information identifies that the content of the first information is hidden.

The displaying, by the terminal, a third lock screen, where the third lock screen displays the first control, and the first control displays the content of the first information is specifically: displaying, by the terminal, the third lock screen, where the third lock screen displays the first control, the first control displays the content of the first information, and if the first information is an SMS message or information received by an instant messaging application, the content of the first information includes at least one of a sender name, a sender number, and message content of the first information, or if the first information is a missed call notification, the content of the first information includes a caller name or a caller number of a missed call.

In some possible implementations, when the terminal receives a plurality of pieces of hidden information pushed by a same application and a plurality of pieces of hidden information pushed by different applications, the terminal may display one corresponding fingerprint icon for each piece of hidden information, to perform authentication on each piece of hidden information. Alternatively, the terminal may display one fingerprint icon for all hidden information, to perform authentication on all the hidden information. Alternatively, the terminal may display one fingerprint icon for some hidden information, to perform user authentication on the hidden information. For the other hidden information, a different fingerprint icon is displayed to perform user authentication on the hidden information. This is not specifically limited in the embodiments of this application.

For example, for a plurality of pieces of hidden information pushed by a first application, the terminal may use one fingerprint icon to perform authentication on all hidden information of the first application. For a plurality of pieces of hidden information pushed by a second application, the terminal may use another fingerprint icon to perform authentication on all hidden information of the second application. The second application is different from the first application.

According to a second aspect, an information content viewing method is applied to a terminal, the terminal includes a touchscreen, a fingerprint sensor is disposed on the touchscreen, and the method includes: receiving, by the terminal, a call request; displaying, by the terminal, a first screen, where the first screen displays a first control, and the first control prompts that incoming call information of the call request is hidden; receiving, by the terminal, a first operation of a user on the touchscreen, where the first operation is a preset operation used to instruct the terminal to display the incoming call information of the call request; collecting, by the terminal, fingerprint information of the user by using the fingerprint sensor in response to the first operation; and displaying, by the terminal, a second screen in response to a fact that verification on the collected fingerprint information succeeds, where the second screen displays the first control, and the first control displays the incoming call information of the call request.

It can be learned that the terminal collects the fingerprint information of the user based on the first operation of the user on the touchscreen, to perform identity verification on the user, and further instructs the terminal to display the incoming call information after the verification succeeds. In this way, user operations are simplified, efficiency of interaction between the user and the terminal is improved, and user experience is improved.

In some possible implementations, the first screen further displays a fingerprint icon, and the fingerprint icon is associated with the fingerprint sensor; and the receiving, by the terminal, a first operation of a user on the touchscreen is specifically: receiving, by the terminal, the first operation of the user at a display location of the fingerprint icon.

In some possible implementations, the display location of the fingerprint icon partially overlaps a display location of the first control.

In some possible implementations, after the displaying, by the terminal, a second screen, the method further includes: receiving, by the terminal, a second operation of the user, where the second operation is an operation of answering a call; and establishing, by the terminal, a communication connection.

In some possible implementations, the displaying, by the terminal, a first screen, where the first screen displays a first control, and the first control prompts that incoming call information of the call request is hidden is specifically: displaying, by the terminal, the first screen, where the first screen displays the first control, and a caller number is marked as an unknown caller on the first control; and the displaying, by the terminal, a second screen, where the second screen displays the first control, and the first control displays the incoming call information of the call request is specifically: displaying, by the terminal, the second screen, where the second screen displays the first control, the first control displays the incoming call information of the call request, and the incoming call information includes at least one of a name of an incoming call contact, the caller number, and a home location of the caller number.

In some possible implementations, when the terminal displays a screen existing when the call request is received, if some information of the communication request is hidden on the screen, for example, incoming call contact information is hidden, or the caller number is hidden, the terminal may display no answer control, or the terminal displays an answer control, but the control is inoperable. After the terminal receives an operation of the user for displaying the hidden information, only when the terminal displays the incoming call contact information and the caller number, the terminal displays the answer control, or switches the inoperable answer control to an operable answer control, in other words, allows the user to answer the incoming call. In this way, when the incoming call contact information is hidden, or the caller number is hidden, the terminal does not allow the user to answer the incoming call.

According to a third aspect, a terminal includes a touchscreen, at least one fingerprint sensor is disposed on the touchscreen, and the terminal includes: a display unit, configured to display a first lock screen or in a screen-off state; a receiving unit, configured to receive first information, where the display unit is further configured to display a second lock screen, where the second lock screen displays a first control, and the first control prompts that content of the first information is hidden; and the receiving unit is further configured to receive a first operation of a user on the touchscreen, where the first operation is a preset operation used to instruct the terminal to display the content of the first information; and a processing unit, configured to collect fingerprint information of the user by using the at least one fingerprint sensor in response to the first operation, where the display unit is further configured to display a third lock screen in response to a fact that verification on the fingerprint information collected by the processing unit succeeds, where the third lock screen displays the first control, and the first control displays the content of the first information.

In some possible implementations, that the first control displayed by the display unit prompts that content of the first information is hidden includes: the first control displays preset content instead of the content of the first information, and the preset content is different from the content of the first information; or the first control displays prompt information, to prompt that the content of the first information is hidden.

In some possible implementations, the processing unit is further configured to: before the display unit displays the second lock screen, determine, based on the first information, that the first information meets a preset condition, where the preset condition is any one or more of the following: the first information is pushed by a preset application, a sending party of the first information is a preset contact, the first information is received by the terminal within a preset time period, and the first information is received by the terminal at a preset location.

In some possible implementations, the display unit is further configured to display a first fingerprint icon on the second lock screen, the first fingerprint icon corresponds to the first control, a display location of the first fingerprint icon partially overlaps a display location of the first control, and a fingerprint sensor is disposed at the display location of the first fingerprint icon; that the receiving unit is further configured to receive a first operation of a user on the touchscreen is specifically: the receiving unit is further configured to receive the first operation of the user at the display location of the first fingerprint icon; and that the processing unit is configured to collect fingerprint information of the user by using the at least one fingerprint sensor in response to the first operation is specifically: the processing unit is configured to collect the fingerprint information of the user by using the fingerprint sensor at the display location of the first fingerprint icon in response to the first operation.

In some possible implementations, the display unit is further configured to display a second control and a second fingerprint icon on the second lock screen, the second control prompts that content of second information is hidden, the second fingerprint icon corresponds to the second control, a display location of the second fingerprint icon partially overlaps a display location of the second control, and a fingerprint sensor is disposed at the display location of the second fingerprint icon.

In some possible implementations, that the display unit is further configured to display a third lock screen, where the third lock screen displays the first control, and the first control displays the content of the first information is specifically: the display unit is further configured to display the third lock screen, where the third lock screen displays the first control and the second control, the first control displays the content of the first information, and the second control prompts that the content of the second information is hidden.

In some possible implementations, the receiving unit is further configured to receive a second operation of the user at the display location of the second fingerprint icon after the display unit displays the third lock screen; the processing unit is further configured to collect fingerprint information of the user by using the fingerprint sensor at the display location of the second fingerprint icon in response to the second operation; and the display unit is further configured to display a fourth lock screen in response to a fact that verification on the collected fingerprint information succeeds, where the fourth lock screen displays the first control and the second control, the first control displays the content of the first information, and the second control displays the content of the second information.

In some possible implementations, the display unit is further configured to display a third control on the second lock screen, the third control prompts that content of third information is hidden, the first fingerprint icon corresponds to the first control and the second third control, and the display location of the first fingerprint icon partially overlaps a display location of the third control; and that the display unit is further configured to display a third lock screen, where the third lock screen displays the first control, and the first control displays the content of the first information is specifically: the display unit is further configured to display the third lock screen, where the third lock screen displays the first control and the third control, the first control displays the content of the first information, and the third control displays the content of the third information.

In some possible implementations, that the display unit is further configured to display a second lock screen, where the second lock screen displays a first control, and the first control prompts that content of the first information is hidden is specifically: the display unit is further configured to display the second lock screen, where the second lock screen displays the first control, the first control displays prompt information, and the prompt information identifies that the content of the first information is hidden; and that the display unit is further configured to display a third lock screen, where the third lock screen displays the first control, and the first control displays the content of the first information is specifically: the display unit is further configured to display the third lock screen, where the third lock screen displays the first control, the first control displays the content of the first information, and if the first information is an SMS message or information received by an instant messaging application, the content of the first information includes at least one of a sender name, a sender number, and message content of the first information, or if the first information is a missed call notification, the content of the first information includes a caller name or a caller number of a missed call.

According to a fourth aspect, a terminal includes a touchscreen, a fingerprint sensor is disposed on the touchscreen, and the terminal includes: a receiving unit, configured to receive a call request; a display unit, configured to display a first screen, where the first screen displays a first control, and the first control prompts that incoming call information of the call request is hidden, where the receiving unit is further configured to receive a first operation of a user on the touchscreen, where the first operation is a preset operation used to instruct the terminal to display the incoming call information of the call request; and a processing unit, configured to collect fingerprint information of the user by using the fingerprint sensor in response to the first operation, where the display unit is further configured to display a second screen in response to a fact that verification on the collected fingerprint information succeeds, where the second screen displays the first control, and the first control displays the incoming call information of the call request.

In some possible implementations, the display unit is further configured to display a fingerprint icon on the first screen, and the fingerprint icon is associated with the fingerprint sensor; and that the receiving unit is further configured to receive a first operation of a user on the touchscreen is specifically: the receiving unit is further configured to receive the first operation of the user at a display location of the fingerprint icon.

In some possible implementations, the display location of the fingerprint icon partially overlaps a display location of the first control.

In some possible implementations, the receiving unit is further configured to: after the display unit displays the second screen, receive a second operation of the user, where the second operation is an operation of answering a call; and the processing unit is further configured to establish a communication connection.

In some possible implementations, that the display unit is configured to display a first screen, where the first screen displays a first control, and the first control prompts that incoming call information of the call request is hidden is specifically: the display unit is configured to display the first screen, where the first screen displays the first control, and a caller number is marked as an unknown caller on the first control; and that the display unit is further configured to display a second screen, where the second screen displays the first control, and the first control displays the incoming call information of the call request is specifically: the display unit is further configured to display the second screen, where the second screen displays the first control, the first control displays the incoming call information of the call request, and the incoming call information includes at least one of a name of an incoming call contact, the caller number, and a home location of the caller number.

According to a fifth aspect, a graphical user interface (GUI) is provided, where the graphical user interface is stored in an electronic device, the electronic device includes a touchscreen, a memory, and one or more processors, the one or more processors are configured to execute one or more computer programs stored in the memory, and the graphical user interface includes a first lock screen displayed on the touchscreen; in response to a fact that the electronic device receives first information, a second lock screen is displayed on the touchscreen, the second lock screen includes a first control, and the first control prompts that content of the first information is hidden; and in response to a fact that the electronic device receives a first operation of a user on the touchscreen and verification on the fingerprint information collected by the electronic device based on the first operation succeeds, a third lock screen is displayed on the touchscreen, the third lock screen includes the first control, the first control displays the content of the first information, and the first operation is a preset operation used to instruct a terminal to display the content of the first information.

In some possible implementations, the second lock screen further includes a first fingerprint icon, the first fingerprint icon corresponds to the first control, a display location of the first fingerprint icon partially overlaps a display location of the first control, and a fingerprint sensor is disposed at the display location of the first fingerprint icon.

In some possible implementations, the second lock screen further includes a second control and a second fingerprint icon, the second control prompts that content of second information is hidden, the second fingerprint icon corresponds to the second control, a display location of the second fingerprint icon partially overlaps a display location of the second control, and a fingerprint sensor is disposed at the display location of the second fingerprint icon.

In some possible implementations, that the third lock screen includes the first control, and the first control displays the content of the first information is specifically: the third lock screen includes the first control and the second control, the first control displays the content of the first information, and the second control prompts that the content of the second information is hidden.

In some possible implementations, the graphical user interface further includes: in response to a fact that the electronic device receives a second operation of the user at the display location of the second fingerprint icon and verification on fingerprint information collected by the electronic device based on the second operation succeeds, a fourth lock screen is displayed on the touchscreen, the fourth lock screen includes the first control and the second control, the first control displays the content of the first information, and the second control displays the content of the second information.

In some possible implementations, the second lock screen further includes a third control, the third control prompts that content of third information is hidden, the first fingerprint icon corresponds to the first control and the second third control, and the display location of the first fingerprint icon partially overlaps a display location of the third control; and that the third lock screen includes the first control, and the first control displays the content of the first information is specifically: the third lock screen includes the first control and the third control, the first control displays the content of the first information, and the third control displays the content of the third information.

In some possible implementations, that the second lock screen includes a first control, and the first control prompts that content of the first information is hidden is specifically: the second lock screen includes the first control, the first control displays prompt information, and the prompt information identifies that the content of the first information is hidden; and that the third lock screen includes the first control, and the first control displays the content of the first information is specifically: the third lock screen includes the first control, the first control displays the content of the first information, and if the first information is an SMS message or information received by an instant messaging application, the content of the first information includes at least one of a sender name, a sender number, and message content of the first information, or if the first information is a missed call notification, the content of the first information includes a caller name or a caller number of a missed call.

According to a sixth aspect, a graphical user interface (GUI) is provided, where the graphical user interface is stored in an electronic device, the electronic device includes a touchscreen, a memory, and one or more processors, the one or more processors are configured to execute one or more computer programs stored in the memory, and the graphical user interface includes: in response to a fact that the electronic device receives a call request, a first screen is displayed on the touchscreen, the first screen includes a first control, and the first control prompts that incoming call information of the call request is hidden; and in response to a fact that the electronic device receives a first operation of a user on the touchscreen and verification on fingerprint information collected based on the first operation succeeds, a second screen is displayed on the touchscreen, the second screen includes the first control, the first control displays the incoming call information of the call request, and the first operation is a preset operation used to instruct a terminal to display the incoming call information of the call request.

In some possible implementations, the first screen further includes a fingerprint icon, and the fingerprint icon is associated with a fingerprint sensor.

In some possible implementations, that the first screen includes a first control, and the first control prompts that incoming call information of the call request is hidden is specifically: the first screen includes the first control, and a caller number is marked as an unknown caller on the first control; and that the second screen includes the first control, and the first control displays the incoming call information of the call request is specifically: the first control included in the second screen displays the incoming call information of the call request, and the incoming call information includes at least one of a name of an incoming call contact, the caller number, and a home location of the caller number.

According to a seventh aspect, a terminal includes a processor, a memory, and a touchscreen, where the memory, the touchscreen, and the processor are coupled, the memory is configured to store computer program code, the computer program code includes a computer instruction, and when the processor reads the computer instruction from the memory, the terminal is enabled to perform the method according to any possible implementation of the first aspect or the second aspect.

According to an eighth aspect, a computer storage medium is provided, including a computer instruction, where when the computer instruction is run on a terminal, the terminal is enabled to perform the method according to any possible implementation of the first aspect or the second aspect.

According to a ninth aspect, a computer program product is provided. When the computer program product is run on a computer, the computer is enabled to perform the method according to any possible implementation of the first aspect or the second aspect.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in the embodiments may be combined in any proper manner. A person skilled in the art understands that an embodiment may be implemented without one or more specific technical features, technical solutions, or beneficial effects in a specific embodiment. In other embodiments, additional technical features and beneficial effects may further be identified in a specific embodiment that does not reflect all the embodiments.

BRIEF DESCRIPTION OF DRAWINGS

FIG. 8B-1 and FIG. 8B-2 are a schematic flowchart of an information content viewing method according to another embodiment of this application;

DESCRIPTION OF EMBODIMENTS

Figure 1:
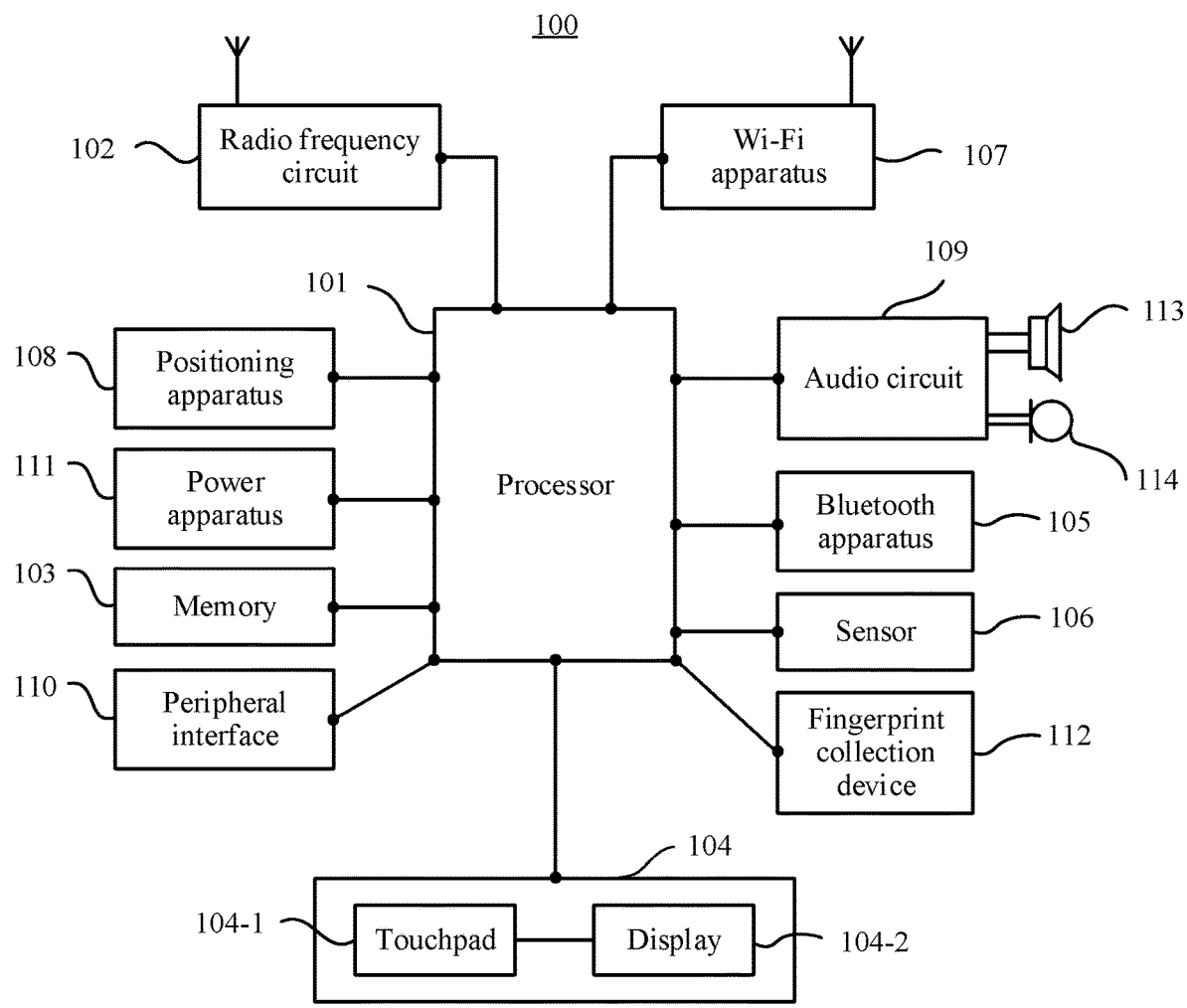
FIG. 1 is a schematic structural diagram 1 of a terminal according to an embodiment of this application.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the description of the embodiments of this application, unless otherwise stated, "a plurality of" means two or more than two.

Usually, hidden information is private. Therefore, when content of the hidden information is viewed, user identity needs to be first verified, and the specific content of the hidden information can be viewed only after the verification succeeds.

To simplify operations of a user, the embodiments of this application provide a technical solution of viewing hidden information content by using a fingerprint verification method. With reference to a feature that a fingerprint is on a finger of the user, in a process in which the user enters the fingerprint, a terminal may collect fingerprint information of the user, and the terminal may identify an operation gesture of the user. Therefore, an operation of entering the fingerprint by the user can enable the terminal to read the fingerprint information of the user to complete user identity verification, and can instruct the terminal to read content of hidden information. It can be learned that, according to the method provided in the embodiments of this application, user operations are simplified, efficiency of interaction between the user and the terminal is improved, and user experience is improved.

Specifically, the method provided in the embodiments of this application may be applied to a terminal with a fingerprint recognition function. A fingerprint collection device may be disposed on a touchscreen of the terminal to implement the fingerprint recognition function. In other words, the fingerprint collection device may be integrated with the touchscreen to implement the fingerprint recognition function of the terminal. In this case, the fingerprint collection device is disposed on the touchscreen, and may be a part of the touchscreen, or may be disposed on the touchscreen in another manner. A main component of the fingerprint collection device in the embodiments of this application may be a fingerprint sensor. The fingerprint sensor may use any type of sensing technology, including but not limited to an optical sensing technology, a capacitive sensing technology, a piezoelectric sensing technology, an ultrasonic sensing technology, or the like.

For example, the terminal in this application may be a mobile phone (for example, a mobile phone 100 shown in FIG. 1), a tablet computer, a personal computer (Personal Computer, PC), a personal digital assistant (personal digital assistant, PDA), a smartwatch, a netbook, a wearable electronic device, an augmented reality (Augmented Reality, AR) device, a virtual reality (Virtual Reality, VR) device, or the like on which an application may be installed and an application icon may be displayed. A specific form of the terminal is not specially limited in this application.

As shown in FIG. 1, for example, the terminal is the mobile phone 100. The mobile phone 100 may specifically include components such as a processor 101, a radio frequency (Radio Frequency, RF) circuit 102, a memory 103, a touchscreen 104, a Bluetooth apparatus 105, one or more sensors 106, a wireless fidelity (Wireless Fidelity, WI-FI) apparatus 107, a positioning apparatus 108, an audio circuit 109, a peripheral interface 110, and a power apparatus 111. These components may communicate with each other by using one or more communications buses or signal cables (not shown in FIG. 1). A person skilled in the art may understand that a hardware structure shown in FIG. 1 does not constitute a limitation on the mobile phone, and the mobile phone 100 may include more or fewer components than those shown in the figure, or may combine some components, or may have different component arrangements.

The following describes in detail the components of the mobile phone 100 with reference to FIG. 1.

The processor 101 is a control center of the mobile phone 100. The processor 101 is connected to all parts of the mobile phone 100 by using various interfaces and lines, and performs various functions of the mobile phone 100 and data processing by running or executing an application program stored in the memory 103 and invoking data stored in the memory 103. In some embodiments, the processor 101 may include one or more processing units. For example, the processor 101 may include a baseband processor and an application processor.

The radio frequency circuit 102 may be configured to send and receive a radio signal in an information receiving and sending process or a call process. Particularly, after receiving downlink data from a base station, the radio frequency circuit 102 may send the downlink data to the processor 101 for processing, and sends related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to global system for mobile communications, general packet radio service, code division multiple access, wideband code division multiple access, long term evolution, email, short message service, and the like.

The memory 103 is configured to store the application program and the data. The processor 101 performs various functions of the mobile phone 100 and data processing by running the application program and the data that are stored in the memory 103. The memory 103 mainly includes a program storage area and a data storage area. The program storage area may store an operating system, and an application program required by at least one function (for example, a sound playing function or an image playing function). The data storage area may store data (for example, audio data or a phone book) created based on use of the mobile phone 100. In addition, the memory 103 may include a high-speed random access memory (Random Access Memory, RAM), and may further include a nonvolatile memory such as a magnetic disk storage device, a flash memory device, or another volatile solid-state storage device. The memory 103 may store various operating systems such as an iOS® operating system developed by Apple, and an Android® operating system developed by Google. The memory 103 may be standalone, and is connected to the processor 101 by using the communications bus; or the memory 103 may be integrated into the processor 101. In the embodiments of this application, the memory 103 includes a storage component 207.

The touchscreen 104 may specifically include a touchpad 104-1 and a display 104-2.

The touchpad 104-1 may collect a touch event (for example, an operation performed by a user of the mobile phone 100 on the touchpad 104-1 or near the touchpad 104-1 by using any proper object such as a finger or a stylus) performed by the user on or near the touchpad 104-1, and send collected touch information to another device (for example, the processor 101). The touch event performed by the user near the touchpad 104-1 may be referred to as a floating touch. The floating touch may mean that the user does not need to directly touch the touchpad to select, move, or drag a target (for example, an icon), but the user needs only to be near the device to implement a desired function. In addition, the touchpad 104-1 may be implemented in a plurality of types such as a resistive type, a capacitive type, an infrared type, and a surface acoustic wave type.

The display (also referred to as a display) 104-2 may be configured to display information entered by the user or information provided for the user, and various menus of the mobile phone 100. The display 104-2 may be configured in a form such as a liquid crystal display or an organic light-emitting diode. The touchpad 104-1 may cover the display 104-2. When detecting the touch event on or near the touchpad 104-1, the touchpad 104-1 transfers the touch event to the processor 101 to determine a type of the touch event. Then, the processor 101 can provide corresponding visual output on the display 104-2 based on the type of the touch event. Although in FIG. 1, the touchpad 104-1 and the display 104-2 are used as two independent components to implement input and output functions of the mobile phone 100, in some embodiments, the touchpad 104-1 and the display 104-2 may be integrated to implement the input and output functions of the mobile phone 100. It may be understood that the touchscreen 104 is formed by stacking a plurality of layers of materials. Details are not described in the embodiments of this application. In addition, the touchpad 104-1 may be disposed on a front side of the mobile phone 100 in a full panel form, and the display 104-2 may also be disposed on the front side of the mobile phone 100 in a full panel form. In this way, a bezel-less structure can be implemented on the front side of the mobile phone, for example, a bezel-less mobile phone.

In addition, the mobile phone 100 may further have a fingerprint recognition function. For example, a fingerprint sensor 112 may be disposed on a rear side of the mobile phone 100 (for example, below a rear-facing camera), or a fingerprint sensor 112 may be disposed on the front side of the mobile phone 100 (for example, below the touchscreen 104).

The mobile phone 100 may further include the Bluetooth apparatus 105, configured to implement data exchange between the mobile phone 100 and another short-distance device (for example, a mobile phone or a smartwatch). In the embodiments of this application, the Bluetooth apparatus may be an integrated circuit, a Bluetooth chip, or the like.

The mobile phone 100 may further include at least one type of sensor 106, such as a light sensor, a motion sensor, and another sensor. Specifically, the light sensor may include a proximity sensor. The proximity sensor may turn off the display when the mobile phone 100 moves to an ear. As one type of the motion sensor, an accelerometer sensor may detect acceleration values in all directions (usually on three axes). The accelerometer sensor may detect a value and a direction of gravity when the accelerometer sensor is stationary, and may be used in an application for recognizing a mobile phone posture (such as switching between landscape mode and portrait mode, a related game, or magnetometer posture calibration), a function related to vibration recognition (such as a pedometer or a knock), or the like. For another sensor that may be further configured on the mobile phone 100, such as a gyroscope, a barometer, a hygrometer, a thermometer, or an infrared sensor, details are not described herein.

The Wi-Fi apparatus 107 is configured to provide, for the mobile phone 100, network access that complies with a Wi-Fi-related standard protocol. The mobile phone 100 may access a Wi-Fi access point by using the Wi-Fi apparatus 107, to help the user receive and send an email, browse a web page, access streaming media, and the like. The Wi-Fi apparatus 107 provides wireless broadband internet access for the user. In some other embodiments, the Wi-Fi apparatus 107 may also be used as a Wi-Fi wireless access point, and may provide Wi-Fi network access for another device.

The positioning apparatus 108 is configured to provide a geographical location for the mobile phone 100. It may be understood that the positioning apparatus 108 may be specifically a receiver of a positioning system such as a global positioning system (Global Positioning System, GPS), a BeiDou navigation satellite system, or a Russian GLONASS. After receiving the geographic location sent by the positioning system, the positioning apparatus 108 sends the information to the processor 101 for processing, or sends the information to the memory 103 for storage. In some other embodiments, the positioning apparatus 108 may be alternatively a receiver of an assisted global positioning system (Assisted Global Positioning System, AGPS). The AGPS system serves as an assisted server to assist the positioning apparatus 108 in completing ranging and positioning services. In this case, the assisted positioning server communicates with a device such as the positioning apparatus 108 (namely, the GPS receiver) of the mobile phone 100 through a wireless communications network, to provide positioning assistance. In some other embodiments, the positioning apparatus 108 may be a positioning technology based on a Wi-Fi access point. Each Wi-Fi access point has a globally unique media access control (Media Access Control, MAC) address, and the device can scan and collect a broadcast signal of a surrounding Wi-Fi access point when Wi-Fi is enabled. Therefore, the device can obtain a MAC address broadcast by the Wi-Fi access point. The device sends such data (for example, the MAC address) that can identify the Wi-Fi access point to a location server by using a wireless communications network. The location server retrieves a geographic location of each Wi-Fi access point, calculates a geographic location of the device with reference to strength of the Wi-Fi broadcast signal, and sends the geographic location of the device to the positioning apparatus 108 of the device.

The audio circuit 109, a speaker 113, and a microphone 114 may provide an audio interface between the user and the mobile phone 100. The audio circuit 109 may convert received audio data into an electrical signal and then transmit the electrical signal to the speaker 113, and the speaker 113 converts the electrical signal into a sound signal for output. In addition, the microphone 114 converts a collected sound signal into an electrical signal, and the audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identification module card). For example, the peripheral interface 110 is connected to the mouse by using a universal serial bus (Universal Serial Bus, USB) interface, and is connected, by using a metal contact on a card slot of the subscriber identification module card, to the subscriber identification module (Subscriber Identification Module, SIM) card provided by a telecommunications operator. The peripheral interface 110 may be configured to couple the external input/output peripheral device to the processor 101 and the memory 103.

The mobile phone 100 may further include the power apparatus 111 (for example, a battery and a power management chip) that supplies power to the components. The battery may be logically connected to the processor 101 by using the power management chip, to implement functions such as charging and discharging management and power consumption management by using the power apparatus 111.

Although not shown in FIG. 1, the mobile phone 100 may further include a camera (a front-facing camera and/or a rear-facing camera), a flash, a micro projection apparatus, a near field communication (Near Field Communication, NFC) apparatus, and the like. Details are not described herein.

All methods in the following embodiments may be implemented in the mobile phone 100 having the foregoing hardware structure.

Hidden information in the embodiments of this application includes but is not limited to a new message pushed by an application in a terminal (for example, new information of "messaging" or a new message of "WeChat"), information about an incoming call or a missed call (for example, a number of the incoming call or the missed call, or phone number remark information that is set by a user), information about some items in an application (for example, content of "to-do today" in "AI tips", or "flight information" in "AI tips"), some information in an application (for example, information about some contacts in "contacts", or some SMS messages in "messaging"), some files in a folder (for example, some video files in a video folder, or some image files in an image folder), some application icons on a home screen, or the like.

When the hidden information is hidden, the user may be prompted that there is new information, but specific content is not displayed. For example, when receiving new information, the terminal displays "information is hidden". Alternatively, specific content may be displayed instead of content of the new information. For example, when there is a new incoming call, the terminal does not display a number and remark information of the incoming call, but displays "unknown number" or the like. Specific display of content of the hidden information when the content is hidden is not limited in the embodiments of this application.

The following describes, by using examples with reference to specific application scenarios, an information content viewing method provided in the embodiments of this application.

Application scenario 1: When a terminal is in a lock-screen state, the terminal receives a new message pushed by an application, and the new message is set to a hidden state.

Figure 7A:
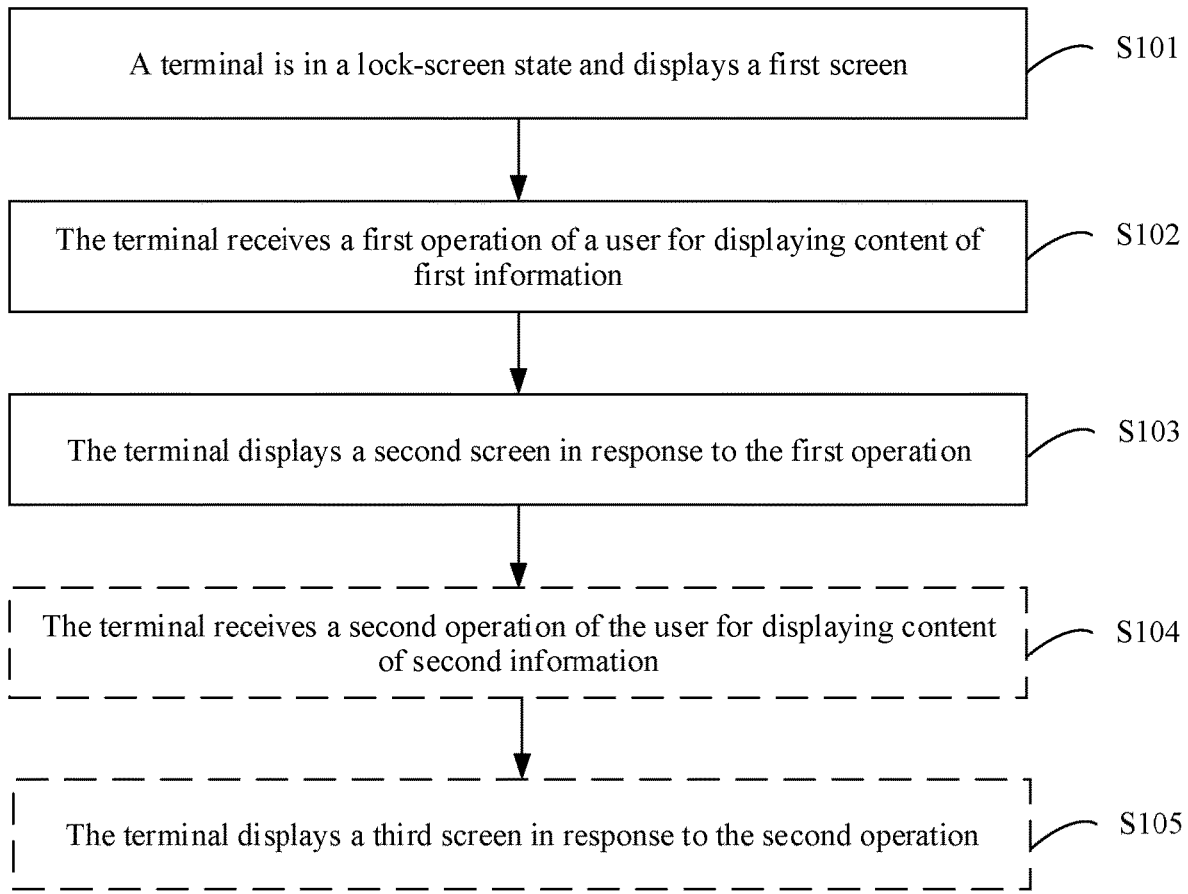
FIG. 7A is a schematic flowchart of an information content viewing method according to an embodiment of this application.

FIG. 7A is a flowchart of an information content viewing method according to an embodiment of this application. The method specifically includes the following steps.

S101: A terminal is in a lock-screen state, and displays a first screen.

The first screen includes a first control, and the first control prompts that first information is in a hidden state. In other words, the first screen does not display content of the first information. The first information is new information pushed by an application, for example, a new message pushed by "messaging", new information pushed by "WeChat", or missed call information pushed by "phone".

In some examples, the first screen further displays a fingerprint icon corresponding to the first control, and the fingerprint icon is used to indicate that a user can enter fingerprint information, so that the terminal displays the content of the first information on the first control. It should be noted that the terminal may display the fingerprint icon on the first control. In other words, a display location of the first control overlaps or partially overlaps a display location of the fingerprint icon. For example, the fingerprint icon may be displayed at any location on a right side of the first information or any location on a left side of the first information on the first control. Alternatively, the terminal may display the fingerprint icon at a location near the first control. In other words, a display location of the first control does not overlap a display location of the fingerprint icon. This is not specifically limited in this embodiment of this application. Optionally, another icon, text, or picture may be used to prompt the user to enter the fingerprint information. Optionally, if a fingerprint sensor in the terminal is at a fixed location, the terminal may display no fingerprint icon. This is not specifically limited in this embodiment of this application.

For example, an example in which the first information is a new message of "WeChat" is used for description. As shown in FIG. 2, the terminal is in a screen-off state (namely, a screen-off state in which a screen is not turned on), and when the terminal receives new information pushed by "WeChat", the terminal turns on the screen, and displays a lock screen (namely, the first screen) of the terminal, for example, a screen 201 shown in FIG. 2(a). A piece of prompt information 202 (namely, the first control) is displayed on the screen 201. The prompt information 202 is used to prompt the user that there is new information (for example, new information of "WeChat"), and content of the new information (namely, the first information) is hidden. In addition, the screen 201 further displays a fingerprint icon 203. The fingerprint icon 203 is used to prompt the user that a fingerprint may be entered, to display the content of the first information.

In some other examples of this application, before the terminal displays the first screen, when receiving the first information, the terminal may first determine whether the content of the first information needs to be hidden. Whether the content of the first information needs to be hidden may be determined by determining whether a sender is a preset specific contact. For example, the user sets some senders to specific contacts. If information from a specific contact is received, prompt information is displayed on a lock screen, and content of the information and a sender are not hidden. Alternatively, whether the content of the first information needs to be hidden may be determined by determining whether the first information is information from a specific application. For example, WeChat is preset to a specific application. When new information of WeChat is received, prompt information is displayed on a lock screen, and content of the information and a sender are not hidden. If it is determined that the content of the first information needs to be hidden, when displaying the first screen, the terminal displays the first control. The first control displays prompt information of the first information, but does not display the content of the first information. The fingerprint icon corresponding to the first control is displayed. If it is determined that the content of the first information does not need to be hidden, the terminal displays a screen according to a method in the prior art. For example, the terminal displays the first control on the lock screen, and the first control displays the content of the first information. In addition, the lock screen displays no fingerprint icon corresponding to the first control.

In some other examples of this application, when displaying the first screen, the terminal may alternatively display no fingerprint icon. The terminal displays a fingerprint icon on the first screen when receiving an operation entered by the user for displaying the fingerprint icon. For example, the operation entered by the user for displaying the fingerprint icon may be that the user enters a corresponding operation, for example, tapping, double-tapping, touching and holding, sliding, or a user-defined operation, at a location of the first control.

Figure 3A:
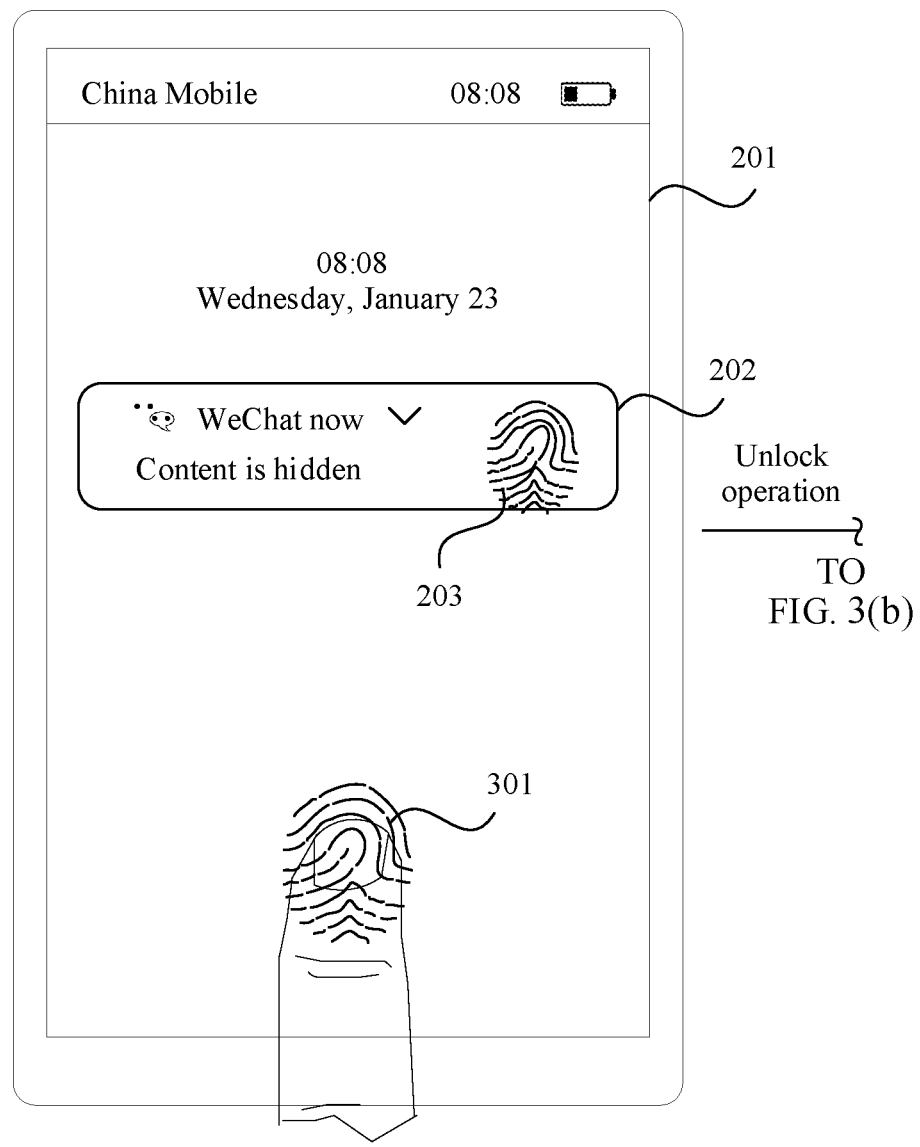
FIG. 3(a) and FIG. 3(b) are a schematic diagram of some graphical user interfaces displayed on a terminal according to some other embodiments of this application.
Figure 3B:
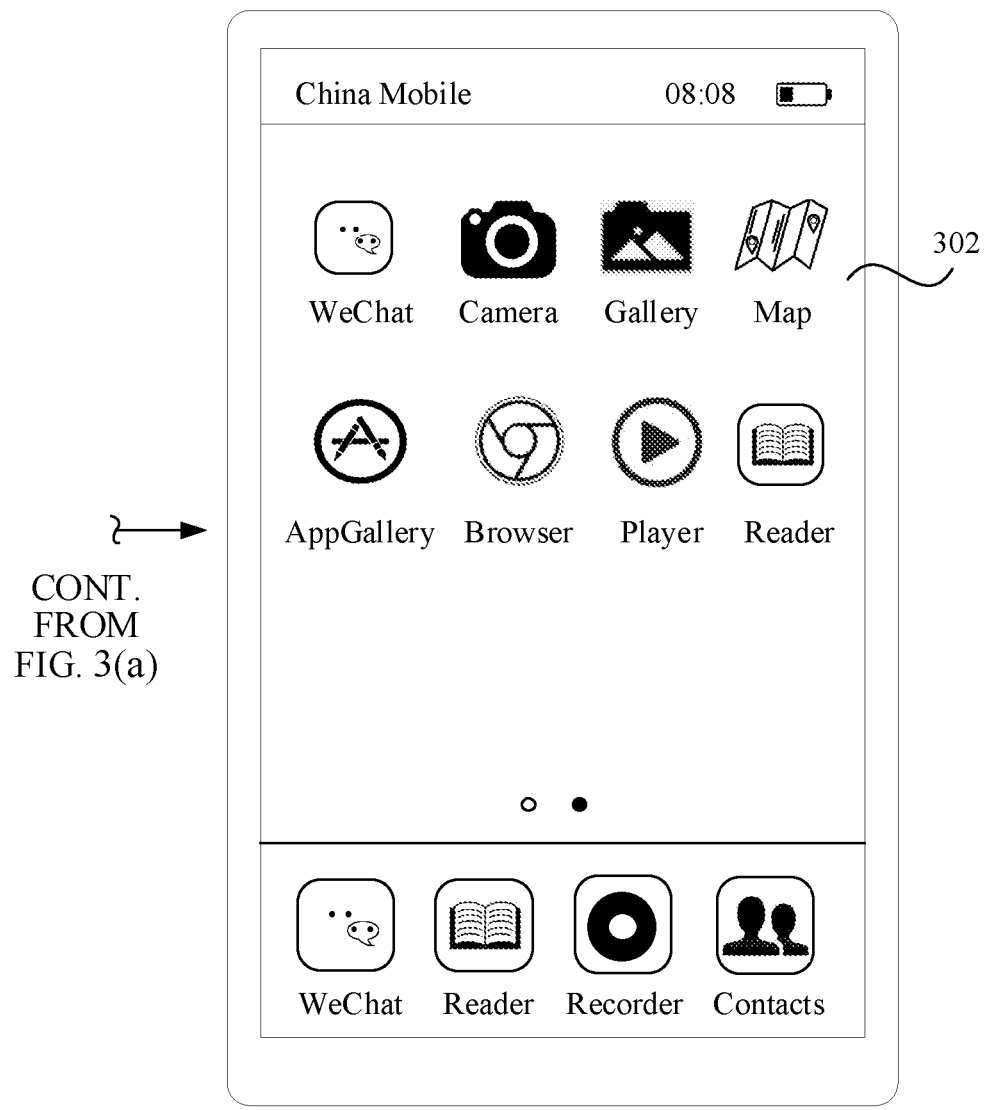

In some other examples of this application, the first screen further includes a fingerprint icon used to unlock the screen. As shown in FIG. 3(a), the screen 201 further displays a fingerprint icon 301, and the fingerprint icon 301 is used to prompt the user to enter a fingerprint used for unlocking. After detecting that the user enters the fingerprint used for unlocking at a location of the fingerprint icon 301, the terminal unlocks the screen, and enters a screen displayed by the terminal before the screen is locked. The screen may be a home screen of the terminal, or may be a screen displayed by the terminal before the screen is locked. For example, a screen 302 shown in FIG. 3(b) is the home screen of the terminal.

It may be understood that a fingerprint required by the fingerprint icon 301 and a fingerprint required by the fingerprint icon 202 may be the same or may be different. This is not limited in this embodiment of this application.

S102: The terminal receives a first operation of the user for displaying the content of the first information.

The first operation is used to instruct the terminal to display the content of the first information on the first control. The first operation may be, for example, an operation performed by the user at a fingerprint input location, and may be, for example, tapping, touching and holding, double-tapping, or sliding. This is not limited in this embodiment of this application.

Figure 2A:
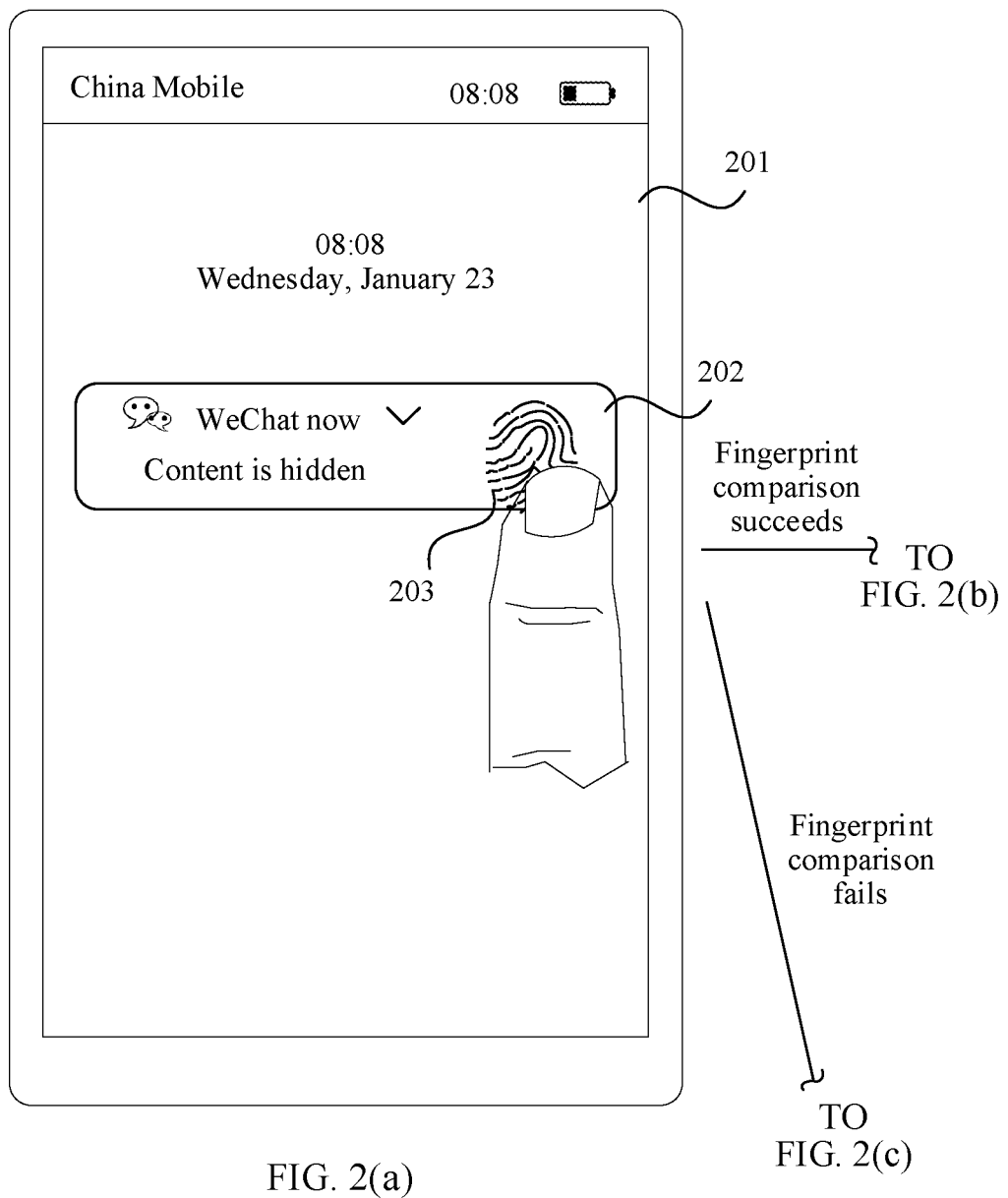
FIG. 2(a) to FIG. 2(c) are a schematic diagram of some graphical user interfaces displayed on a terminal according to some embodiments of this application.

For example, as shown in FIG. 2(a), the first operation may be an operation performed on the fingerprint icon 203, for example, tapping the fingerprint icon 203.

S103: The terminal displays a second screen in response to the first operation.

The second screen displays the content of the first information.

In some examples, the terminal collects fingerprint information of the user based on the first operation of the user. Specifically, in a process in which the user performs the first operation, a finger touches a touchscreen of the terminal. The terminal may collect fingerprint information of the finger of the user by using a fingerprint sensor on the touchscreen. The fingerprint sensor compares the collected fingerprint information with a pre-stored fingerprint template, and uploads a comparison result layer by layer to an application at an application layer. The application at the application layer performs different operations based on the comparison result to display different screens.

Figure 2B:
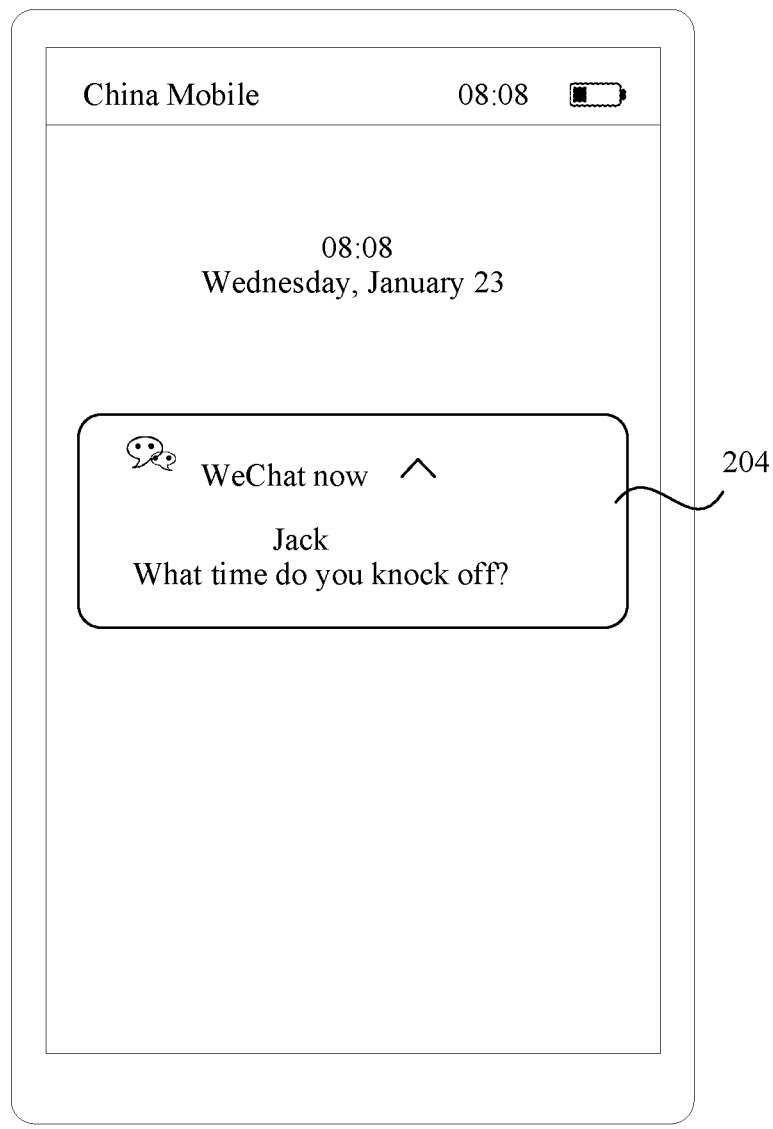

For example, if fingerprint comparison succeeds, it may be determined that the first operation is performed by an authorized user, and the second screen is displayed. The content of the first information is displayed on the first control on the second screen. In other words, the first information is in a displayed state on the second screen. FIG. 2(b) shows a screen 204 displayed after the user fingerprint comparison performed by the terminal succeeds. On the screen 204, the terminal displays the content of the original hidden information. For example, content of the new information (namely, the first information) pushed by "WeChat" is information "what time do you knock off?" sent by "Jack".

In some embodiments of this application, after the fingerprint comparison succeeds, the terminal may further change a display effect of the fingerprint icon 203, to prompt the user that the fingerprint comparison succeeds. For example, the fingerprint icon 203 is changed from gray to another color, for example, red. For another example, before fingerprint comparison is performed, the fingerprint icon 203 is statically displayed. After the fingerprint comparison succeeds, the fingerprint icon 203 is dynamically displayed in a manner such as flashing or an animation effect. For still another example, brightness, contrast, grayscale, or the like of the fingerprint icon 203 is changed. This is not limited in this embodiment of this application.

Figure 2C:
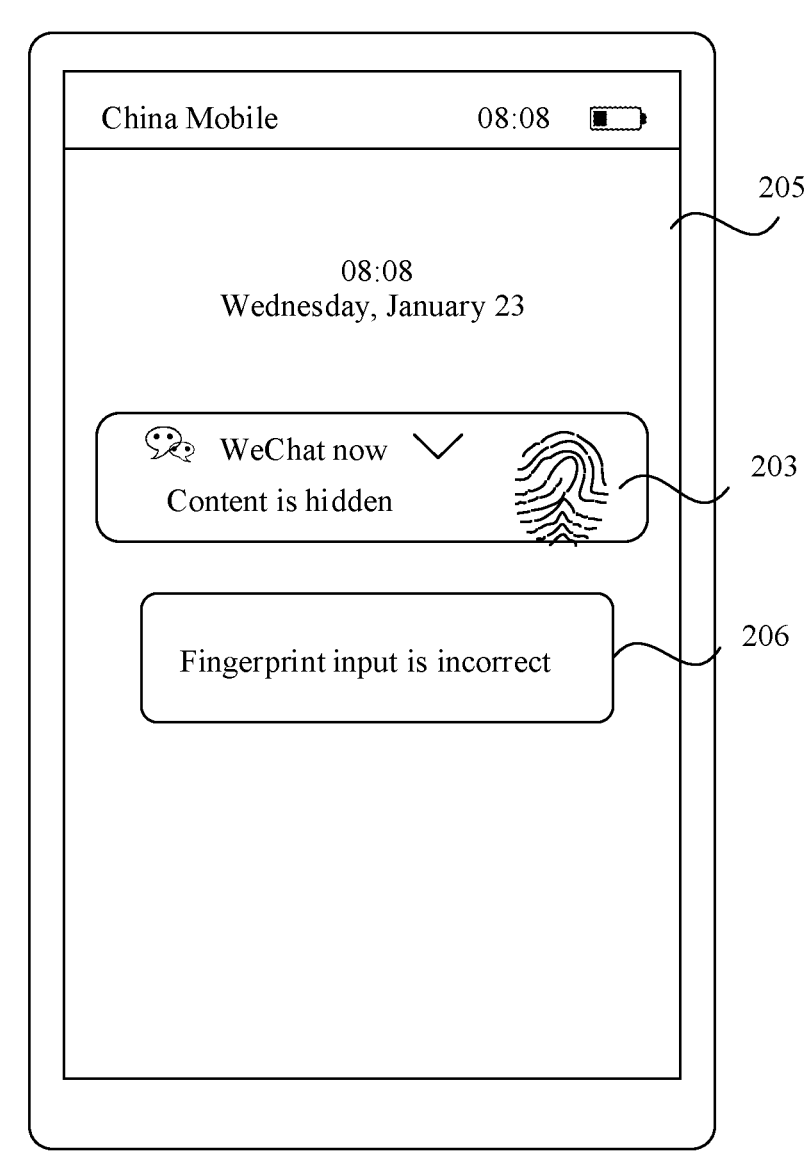

If the fingerprint comparison fails, it is determined that the first operation is performed by an unauthorized user, and the first information is kept in a hidden state. In other words, the content of the first information is not displayed. The terminal may further display prompt information, to prompt the user that fingerprint input is incorrect, as shown by a screen 205 in FIG. 2(c). The screen 205 displays prompt information 206. Optionally, the terminal may vibrate or change a color, grayscale, brightness, or the like of the fingerprint icon 203, to prompt the user that the fingerprint comparison fails. This is not limited in this embodiment of this application.

In some examples of this application, when the terminal displays the content of the first information on the second screen, the terminal is not unlocked. If the user needs to further use another function of the terminal, the user needs to first unlock the terminal, and then uses the terminal. In some other examples of this application, the terminal may obtain the fingerprint information of the user from the first operation in step S102, and may verify an identity of the user. Therefore, the terminal may alternatively be directly unlocked. In other words, the terminal has been unlocked when the terminal displays the second screen. In this way, the user can directly use another function of the terminal.

In some other examples of this application, the terminal may identify an operation gesture of the first operation, and the operation gesture is tapping, double-tapping, touching and holding, sliding, a user-defined operation gesture, or the like. When the operation gesture of the first operation is a preset operation gesture, and the fingerprint information comparison corresponding to the first operation succeeds, the terminal displays the second screen, and the second screen displays the content of the first information.

It can be learned that the terminal collects the fingerprint information of the user based on the fingerprint input operation of the user, to perform identity verification on the user, and further instructs the terminal to display the content of the first information after the verification succeeds. In this way, user operations are simplified, efficiency of interaction between the user and the terminal is improved, and user experience is improved.

When the first screen may include a plurality of pieces of hidden information, the terminal may display different fingerprint icons for different hidden information, to prompt the user to enter a fingerprint, so as to view content of corresponding hidden information. In other words, one piece of hidden information corresponds to one fingerprint icon.

For example, the first screen includes the first control, and the first control prompts that the first information is in a hidden state. The first screen further includes a second control, and the second control prompts that second information is in a hidden state. It should be noted that the second information on the second control and the first information on the first control may be new information pushed by a same application, or may be new information pushed by different applications. This is not limited in this embodiment of this application.

In addition, the first screen displays the fingerprint icon corresponding to the first control, to prompt the user to enter a fingerprint, so that the terminal displays the content of the first information. The first screen further displays a fingerprint icon corresponding to the second control, to prompt the user to enter a fingerprint, so that the terminal displays content of the second information.

It may be understood that, after the terminal performs steps S101 to S103, on the second screen displayed by the terminal, the first control displays the content of the first information. In addition, the second control still prompts that the second information is in a hidden state. In other words, the second control does not display the content of the second information. The second screen still displays the fingerprint icon corresponding to the second control.

After step S103, the method provided in this embodiment of this application further includes the following steps.

S104: The terminal receives a second operation of the user for displaying the content of the second information.

The second operation is used to instruct the terminal to display the content of the second information on the second control. The first operation may be, for example, an operation performed by the user at a fingerprint input location, and may be, for example, tapping, touching and holding, double-tapping, or sliding. This is not limited in this embodiment of this application.

Figure 4A:
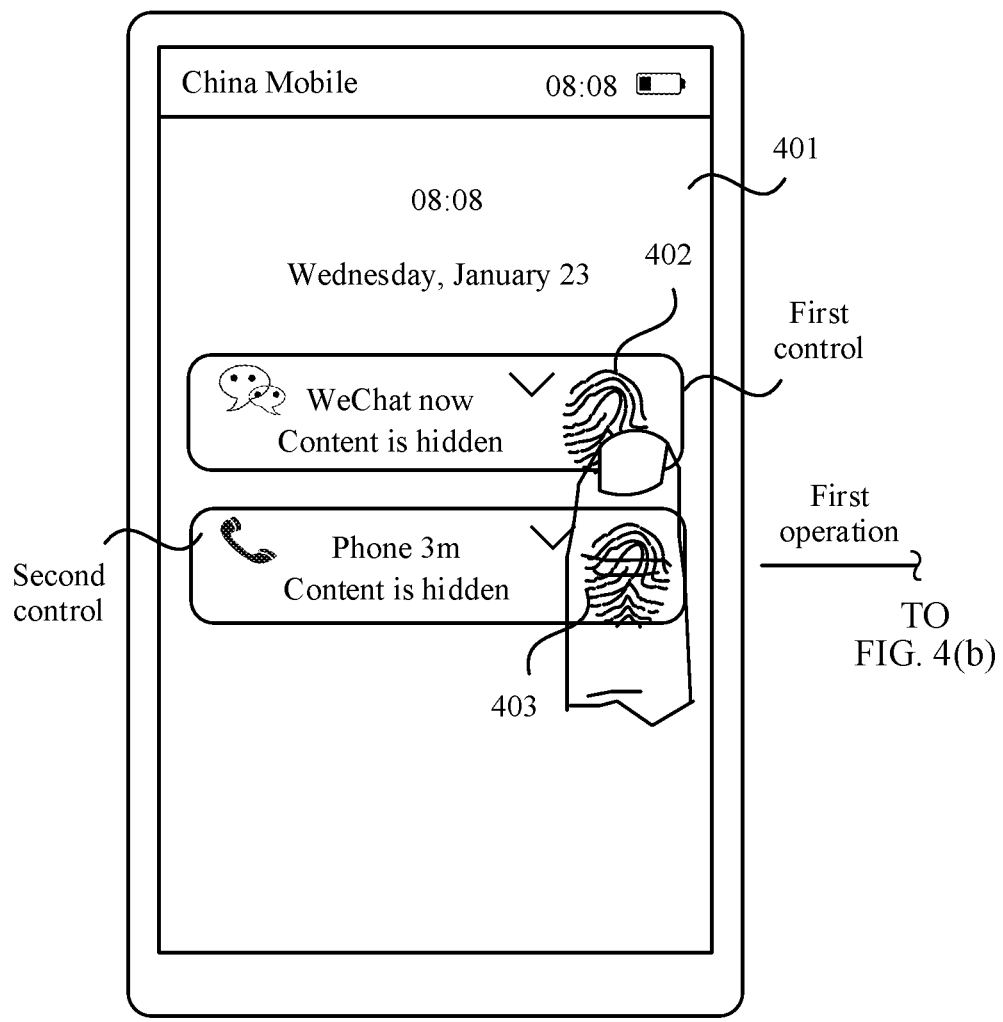
FIG. 4(a) to FIG. 4(c) are a schematic diagram of some graphical user interfaces displayed on a terminal according to some other embodiments of this application.
Figure 4B:
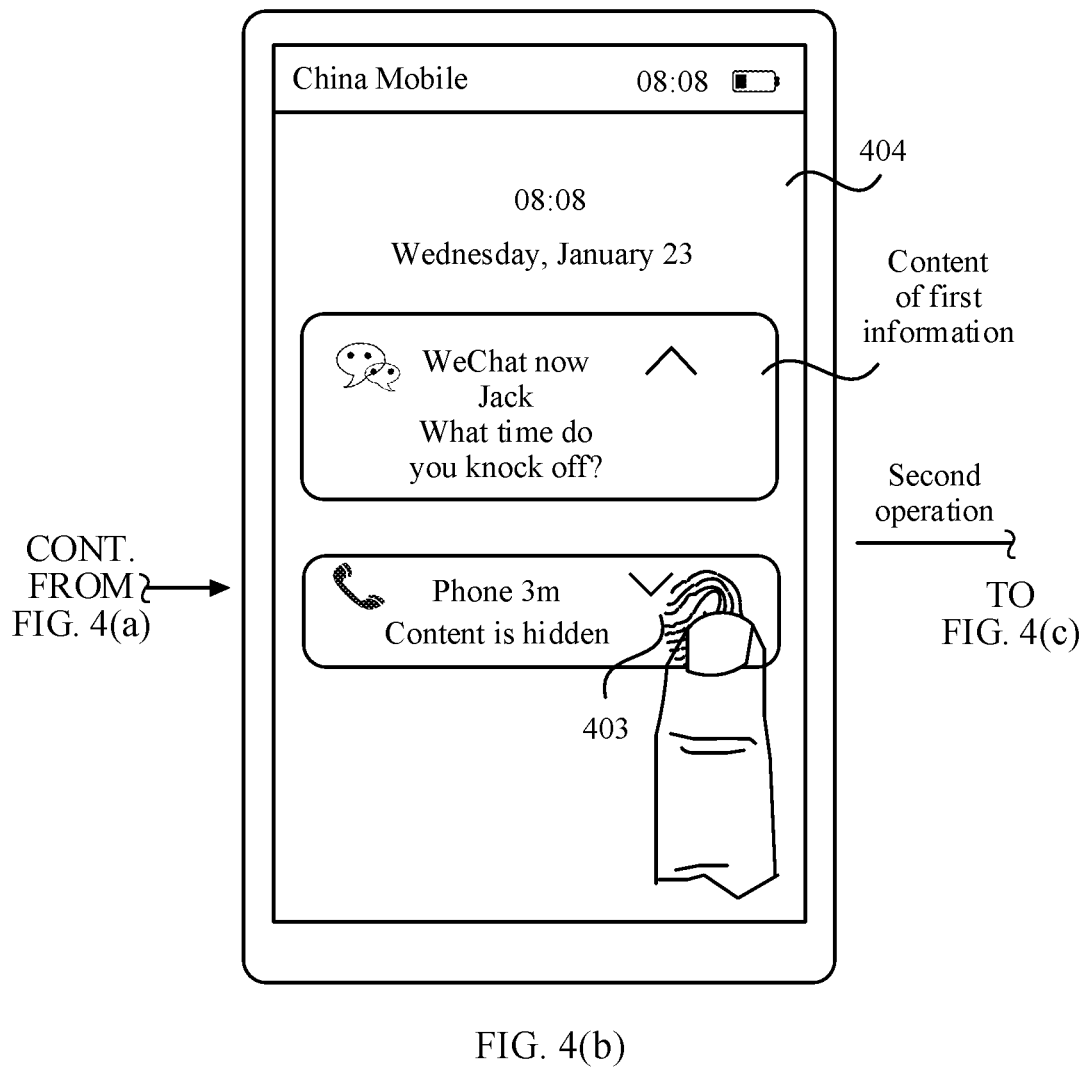
Figure 4C:
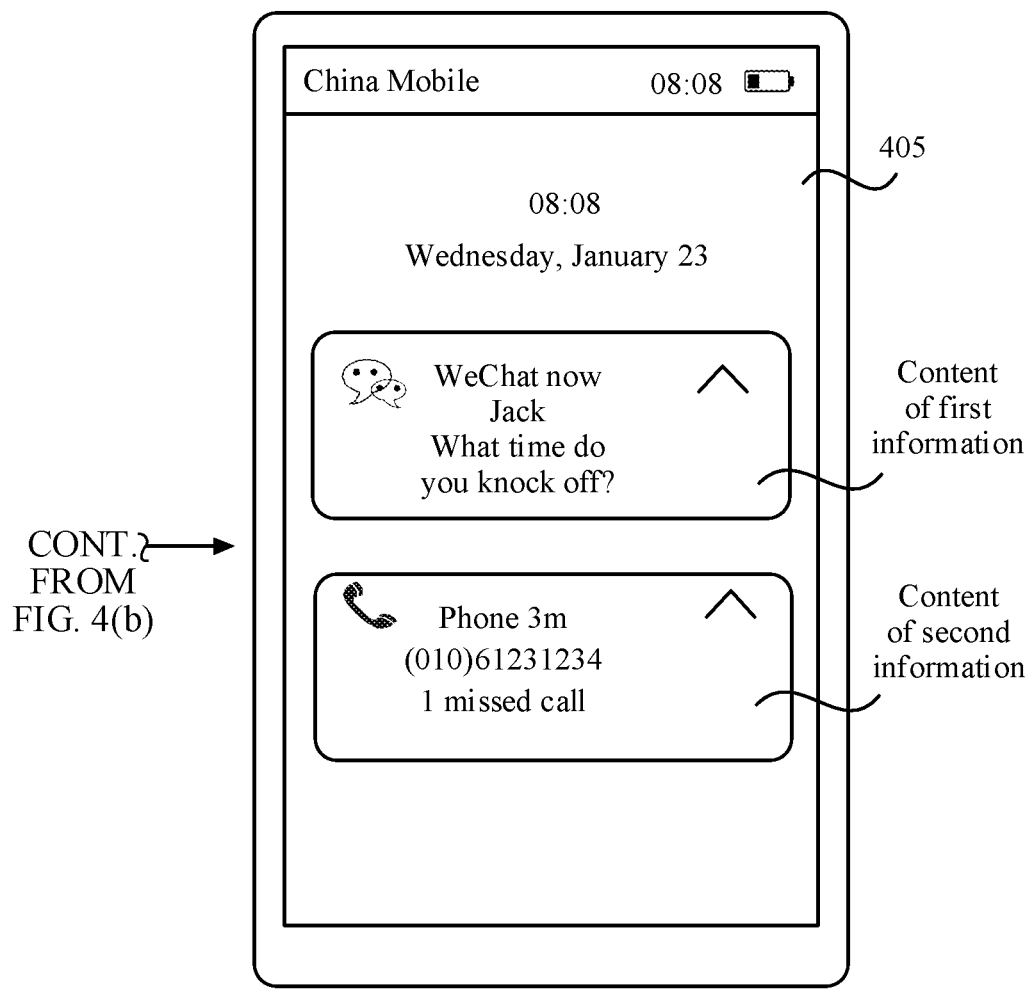

For example, as shown in FIG. 4(b), the second operation may be an operation performed on a fingerprint icon 403, for example, tapping the fingerprint icon 403.

S105: The terminal displays a third screen in response to the second operation.

The third screen displays the content of the second information.

In some examples, the terminal collects fingerprint information of the user based on the second operation of the user. Specifically, in a process in which the user performs the second operation, a finger touches the touchscreen of the terminal. The terminal may collect fingerprint information of the finger of the user by using a fingerprint sensor on the touchscreen. The fingerprint sensor compares the collected fingerprint information with a pre-stored fingerprint template, and uploads a comparison result layer by layer to an application at the application layer. The application at the application layer performs different operations based on the comparison result to display different screens. For example, if fingerprint comparison succeeds, it may be determined that the second operation is performed by an authorized user, and the third screen is displayed. The content of the second information is displayed on the second control on the third screen. In other words, the second information is in a displayed state on the third screen.

It may be understood that the first control on the third screen may still display the content of the first information, or when the second control displays the second information, to save space on the screen, the first control displays a part of the content of the first information, or does not display the content of the first information. This is not specifically limited in this embodiment of this application.

For example, an example in which the first information is a new message of "WeChat" and the second information is a missed call of "phone" is used for description. A screen 401 (namely, the first screen) shown in FIG. 4(a) includes the first control and the second control. The first control indicates that the content of the first information (the new message of "WeChat") is hidden, and the second control indicates that the content of the second information (the missed call of "phone") is hidden. In addition, the first control corresponds to a fingerprint icon 402, and the fingerprint icon 402 is used to prompt the user to enter a fingerprint to view the content of the first information. Likewise, the second control corresponds to the fingerprint icon 403, and the fingerprint icon 403 is used to prompt the user to enter a fingerprint to view the content of the second information.

In this case, when receiving the first operation (for example, the user taps the fingerprint icon 402) of the user for displaying the content of the first information, the terminal displays a screen 404 (namely, the second screen) shown in FIG. 4(b). It can be learned that the first control on the screen 402 displays the content of the first information, the second control still prompts that the second information is hidden, and the second screen still displays the fingerprint icon 403.

Further, the terminal displays the third screen after receiving the second operation (for example, the user taps the fingerprint icon 403) of the user for displaying the second information. The second control on the third screen displays the content of the second information. In other words, the second information on the third screen is in a displayed state.

It can be learned that when the terminal displays a plurality of pieces of hidden information, the terminal may perform user identity verification for each piece of hidden information, to ensure user privacy and improve user experience.

When the first screen includes a plurality of pieces of hidden information, the terminal may display one fingerprint icon for the plurality of pieces of hidden information, to prompt the user to enter a fingerprint, so as to view content of the plurality of pieces of hidden information. In other words, the plurality of pieces of hidden information correspond to one fingerprint icon.

For example, the first screen includes the first control, and the first control prompts that the first information is in a hidden state. The first screen further includes a third control, and the third control prompts that third information is in a hidden state. It should be noted that the third information on the third control and the first information on the first control may be new information pushed by a same application, or may be new information pushed by different applications. This is not limited in this embodiment of this application.

In this case, the method provided in this embodiment of this application is similar to the method in steps S101 to S103, and there are only the following differences.

Difference 1: When the terminal performs step S101, the first screen displays a fingerprint icon corresponding to the first control and the third control, to prompt the user to enter a fingerprint, so that the terminal displays the content of the first information and content of the third information.

Figure 5A:
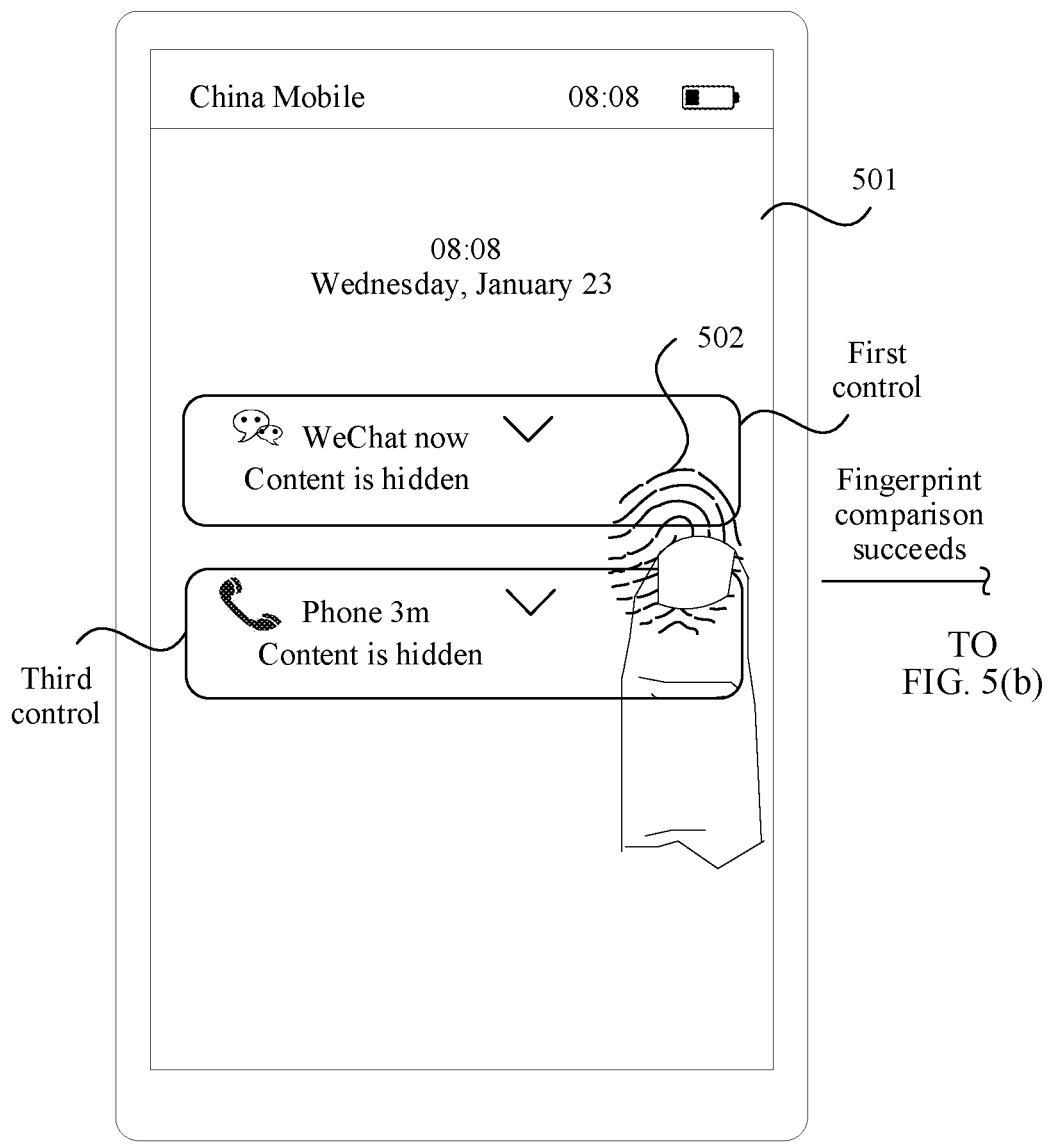
FIG. 5(a) and FIG. 5(b) are a schematic diagram of some graphical user interfaces displayed on a terminal according to some other embodiments of this application.

It should be noted that the terminal may display the fingerprint icon on the first control and the third control. In other words, a display location of the fingerprint icon partially overlaps both the display location of the first control and a display location of the third control. The fingerprint icon may be alternatively displayed at any location on a right side of the first information or any location on a left side of the first information on the first control (or the third information on the third control). Alternatively, the terminal may display the fingerprint icon at a location near the first control (or the third control). In other words, a display location of the fingerprint icon may not overlap the display location of the first control (or the third control). This is not specifically limited in this embodiment of this application. As shown in FIG. 5(a), a screen 501 includes the first control (the new message of "WeChat") and the third control (the missed call of "phone"). The first control and the third control correspond to a fingerprint icon 502.

Difference 2: When the terminal performs step S102, the first operation is used to instruct the terminal to display the content of the first information on the first control and the content of the third information on the third control. The first operation may be, for example, an operation performed by the user on the fingerprint icon corresponding to the first control and the third control, and may be, for example, tapping, touching and holding, double-tapping, or sliding. This is not limited in this embodiment of this application. For example, on the screen 501 shown in FIG. 5(a), the first operation may be an operation performed by the user on the fingerprint icon 502, for example, a tap operation.

Figure 5B:
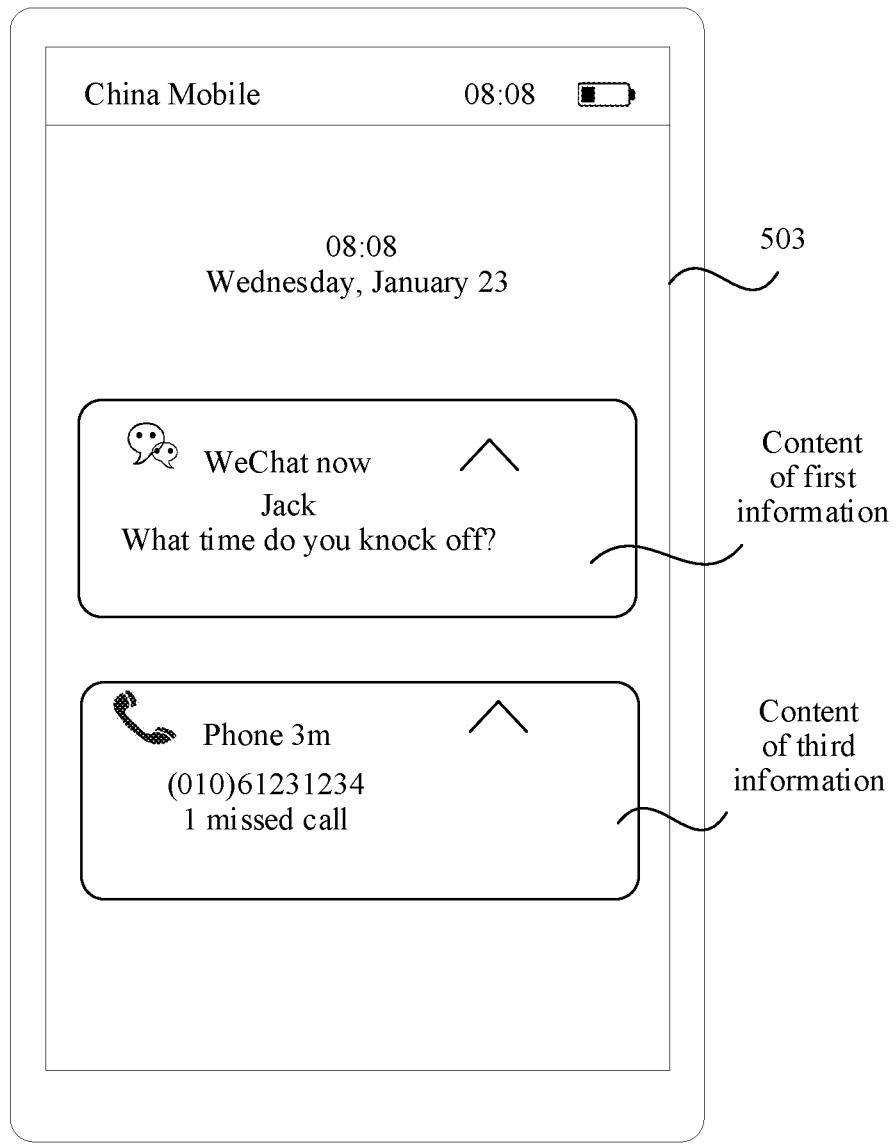

Difference 3: When the terminal performs step S103, on the second screen displayed by the terminal, the first control displays the content of the first information, and the third control displays the content of the third information, for example, as shown by a screen 503 in FIG. 5(b).

For other content, refer to descriptions of related content in steps S101 to S103. Details are not described herein again.

It can be learned that when the terminal receives a plurality of pieces of hidden information, the user may enter fingerprint information once, and the terminal completes user identity verification based on the fingerprint information entered this time, and then displays content of the plurality of pieces of hidden information. In this way, complexity of a user operation is reduced, efficiency of interaction between the user and the terminal is improved, and user experience is improved.

When the terminal receives a plurality of pieces of hidden information pushed by a same application and a plurality of pieces of hidden information pushed by different applications, the terminal may display one corresponding fingerprint icon for each piece of hidden information, to perform authentication on each piece of hidden information. Alternatively, the terminal may display one fingerprint icon for all hidden information, to perform authentication on all the hidden information. Alternatively, the terminal may display one fingerprint icon for some hidden information, to perform user authentication on the hidden information. For the other hidden information, a different fingerprint icon is displayed to perform user authentication on the hidden information. This is not specifically limited in this embodiment of this application.

For example, for a plurality of pieces of hidden information pushed by a first application, the terminal may use one fingerprint icon to perform authentication on all hidden information of the first application. For a plurality of pieces of hidden information pushed by a second application, the terminal may use another fingerprint icon to perform authentication on all hidden information of the second application. The second application is different from the first application.

Figure 6:
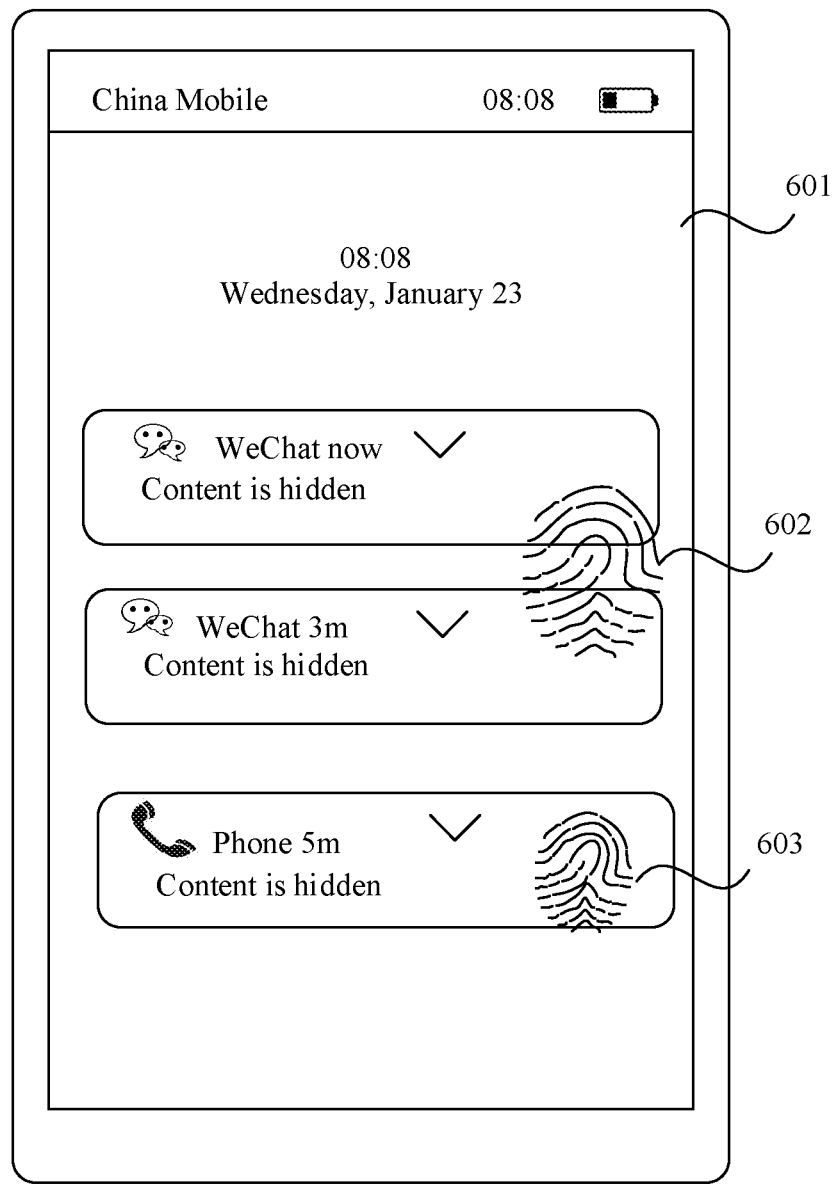
FIG. 6 is a schematic diagram of some graphical user interfaces displayed on a terminal according to some other embodiments of this application.

On a screen 601 shown in FIG. 6, hidden information of the first application (for example, "WeChat") corresponds to a fingerprint icon 602, and hidden information of the second application (for example, "phone") corresponds to a fingerprint icon 603. When the user enters fingerprint information at a location of the fingerprint icon 602, if fingerprint information comparison succeeds, the terminal displays content of all the hidden information in the first application, but does not display content of the hidden information in the second application. When the user enters fingerprint information at a location of the fingerprint icon 603, if fingerprint information comparison succeeds, the terminal displays content of all the hidden information in the second application, but does not display content of the hidden information in the first application.

Figure 7B:
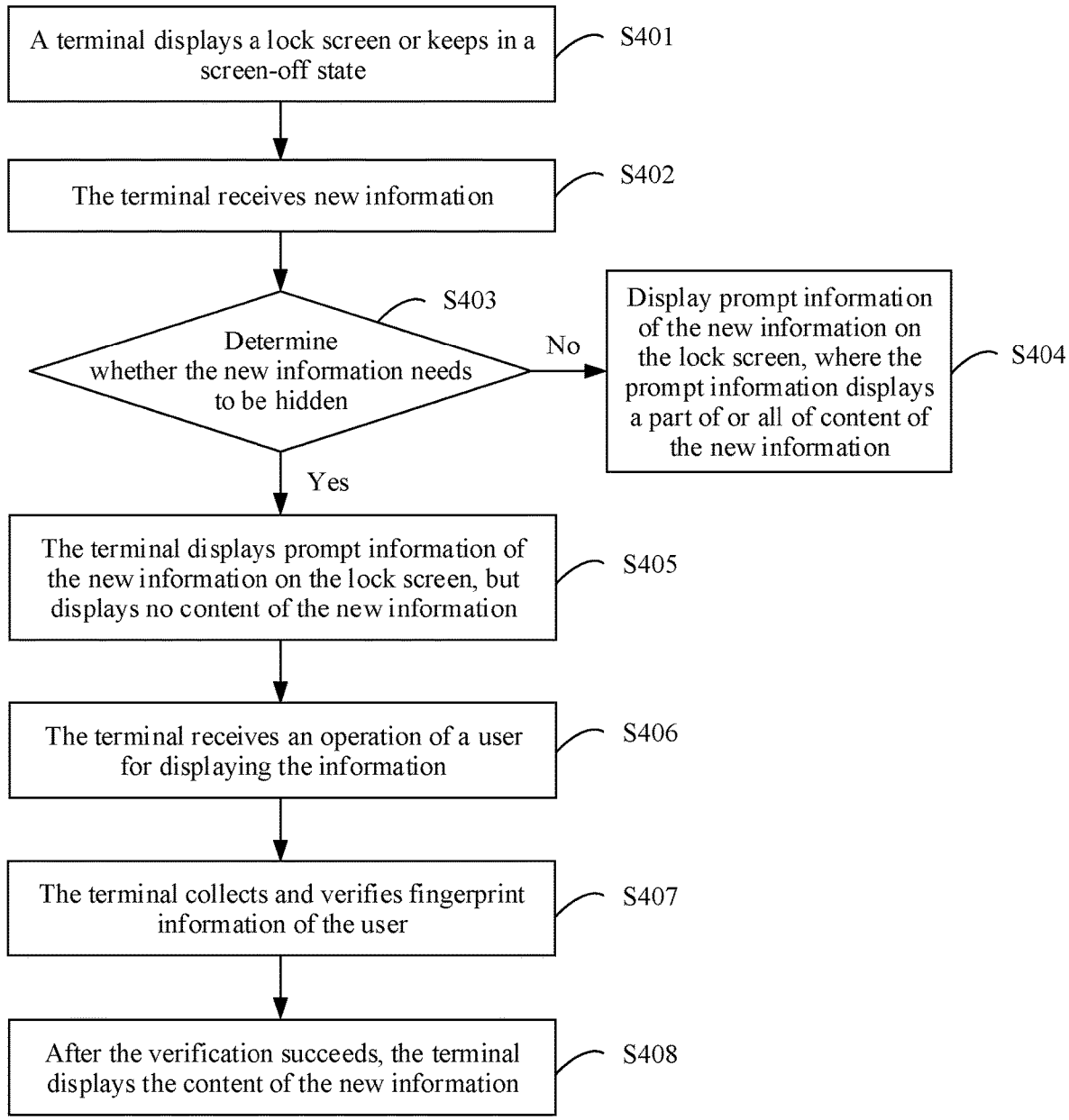
FIG. 7B is a schematic flowchart of an information content viewing method according to another embodiment of this application.

In some other embodiments of this application, the method provided in the embodiments of this application further includes a method for hiding a new message by a terminal. FIG. 7B is a schematic flowchart of an information content viewing method according to an embodiment of this application. The method specifically includes the following steps.

S401: A terminal displays a lock screen or keeps in a screen-off state.

S402: The terminal receives new information.

The new information may be new information pushed by any application or system, for example, new information of "messaging" or a new message of "WeChat".

S403: The terminal determines whether the new information needs to be hidden. If the new information does not need to be hidden, step S404 is performed. If the new information needs to be hidden, step S405 is performed.

In some examples of this application, a user may specify whether to hide new information and specify specific new information that needs to be hidden. For example, the user may further set an application range in which new information needs to be hidden, namely, specific applications whose new information needs to be hidden. The user may further set a contact whose new information needs to be hidden, namely, specific contacts whose information needs to be hidden, or specific groups including contacts whose new information needs to be hidden. In some other examples of this application, the user may further set a time period, a location, or the like for hiding new information, namely, a specific time period (content of new information received in the specific time period needs to be hidden), a specific location (content of new information received by the terminal at the specific location needs to be hidden), or the like. A new information hiding condition that is set by the user is not specifically limited in this embodiment of this application.

Therefore, when receiving the new information, the terminal needs to determine, based on these settings, whether the new information needs to be hidden.

S404: The terminal displays prompt information of the new information on the lock screen, where the prompt information displays a part of or all of content of the new information.

For example, the terminal may display the part of or all of the content of the new information on a control for displaying the prompt information. The user may first unlock the terminal, and then enter a screen of an application to which the new information belongs, to view the content of the new information. In some examples of this application, when the terminal displays the part of the content of the new information on the control for displaying the prompt information, the user may, for example, tap a specific location on the control, so that the terminal unfolds all the content of the new information on the control.

S405: The terminal displays prompt information of the new information on the lock screen, but displays no content of the new information.

In some examples of this application, the prompt information may be any one of the following information: a name of an application to which the new information belongs, a time at which the new information is received, text information indicating that the new information is hidden, and the like. The content that is of the new information and that is not displayed may include information about a sender of the new information, specific content sent by the sender, and the like.

In some examples of this application, the control for displaying the prompt information may further display a fingerprint icon, to prompt the user that fingerprint information may be entered at this location, to view the content of the hidden new information.

In some examples of this application, when there are a plurality of pieces of hidden new information on the lock screen of the terminal, the terminal may display one fingerprint icon for each piece of new information. The terminal may alternatively display one common fingerprint icon for all hidden new information. The terminal may alternatively display one common fingerprint icon for all new information of a same application, and different applications correspond to different fingerprint icons. This is not limited in this embodiment of this application.

If the terminal is in the screen-off state in S401, in S404 and S405, the terminal first turns on a screen, and then displays the lock screen.

S406: The terminal receives an operation of the user for displaying the information.

For example, the terminal receives an operation performed by the user on the fingerprint icon corresponding to the new information, for example, an operation such as tapping, double-tapping, touching and holding, or sliding. The operation may be a preset operation for instructing the terminal to display the content of the new information.

S407: The terminal collects and verifies fingerprint information of the user.

S408: After the verification succeeds, the terminal displays the content of the new information.

In some examples of this application, the terminal displays the specific content of the new information on the control that is on a current screen and that displays the prompt information of the new information. In this case, the terminal is still not unlocked. If the user needs to use another function of the terminal, the user needs to first unlock the terminal. The terminal has obtained the fingerprint information of the user from the operation entered in step S306, and can verify an identity of the user. Therefore, after the verification succeeds, the terminal may also be directly unlocked. This is not specifically limited in this embodiment of this application. It may be understood that the terminal displays the specific content of the new information, and no longer displays the corresponding fingerprint icon.

Application scenario 2: When a terminal is in a lock-screen state or an unlock-screen state, the terminal receives a call request (a video call request or a voice call request), and some information of the call request is set to a hidden state.

The foregoing call may be a voice service provided by a telecommunications operator, a data service provided by a telecommunications operator, an instant messaging service provided by the internet, or the like. This is not limited in this embodiment of this application.

Figure 8A:
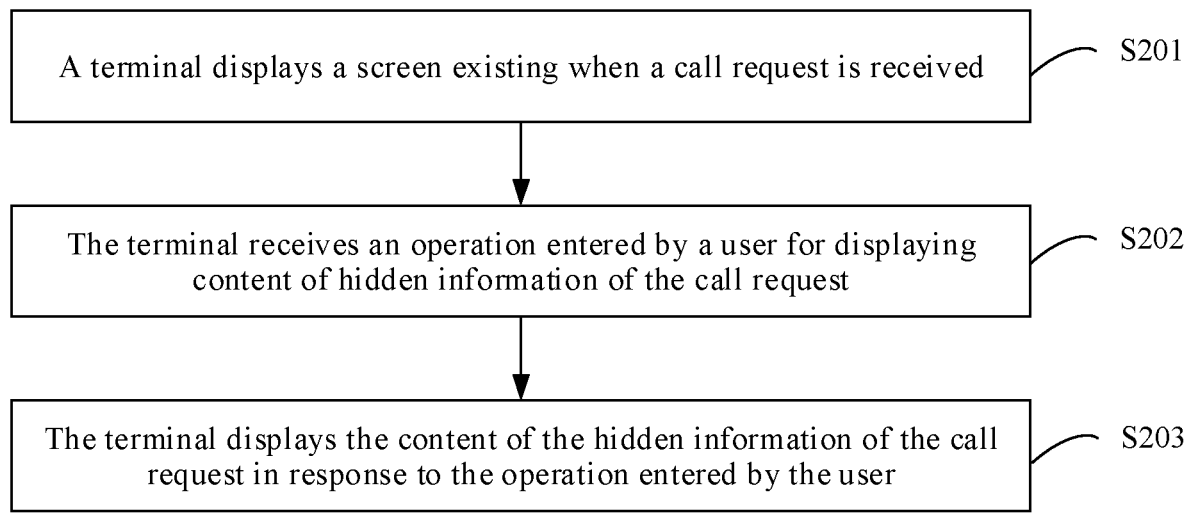
FIG. 8A is a schematic flowchart of an information content viewing method according to another embodiment of this application.

FIG. 8A is a flowchart of an information content viewing method according to an embodiment of this application. The method specifically includes the following steps.

S201: A terminal displays a screen existing when a call request is received.

The screen existing when the call request is received may be a screen existing when the terminal receives a new incoming call, or may be a screen existing when the terminal receives a video call request or a voice call request sent by an instant messaging application. This is not specifically limited in this embodiment of this application.

On the screen, some information of the call request is set to a hidden state. In other words, some information of the communication request is not displayed on the screen, and the information may also be referred to as hidden information. A hiding manner may be that real content of the hidden information is not displayed, or specific content such as "unknown number" or "WeChat user" is displayed instead of content of the hidden information. The specific hiding manner is not limited in this embodiment of this application.

For example, the hidden information may be information such as a number of a new incoming call and remark information corresponding to the number of the new incoming call. The foregoing remark information may be, for example, remark information that is set by a user in contacts in "phone services", for example, information such as company information, a name, or an avatar, or may be remark information that is set by a user in contacts in an instant messaging application, for example, information such as a remark name or an avatar. This is not specifically limited in this embodiment of this application.

On the screen, the terminal further displays a fingerprint icon. The fingerprint icon is used to prompt the user to enter fingerprint information, so as to view the hidden information on the screen. The fingerprint icon may be displayed at any location on a screen. This is not limited in this embodiment of this application.

Figure 9A:
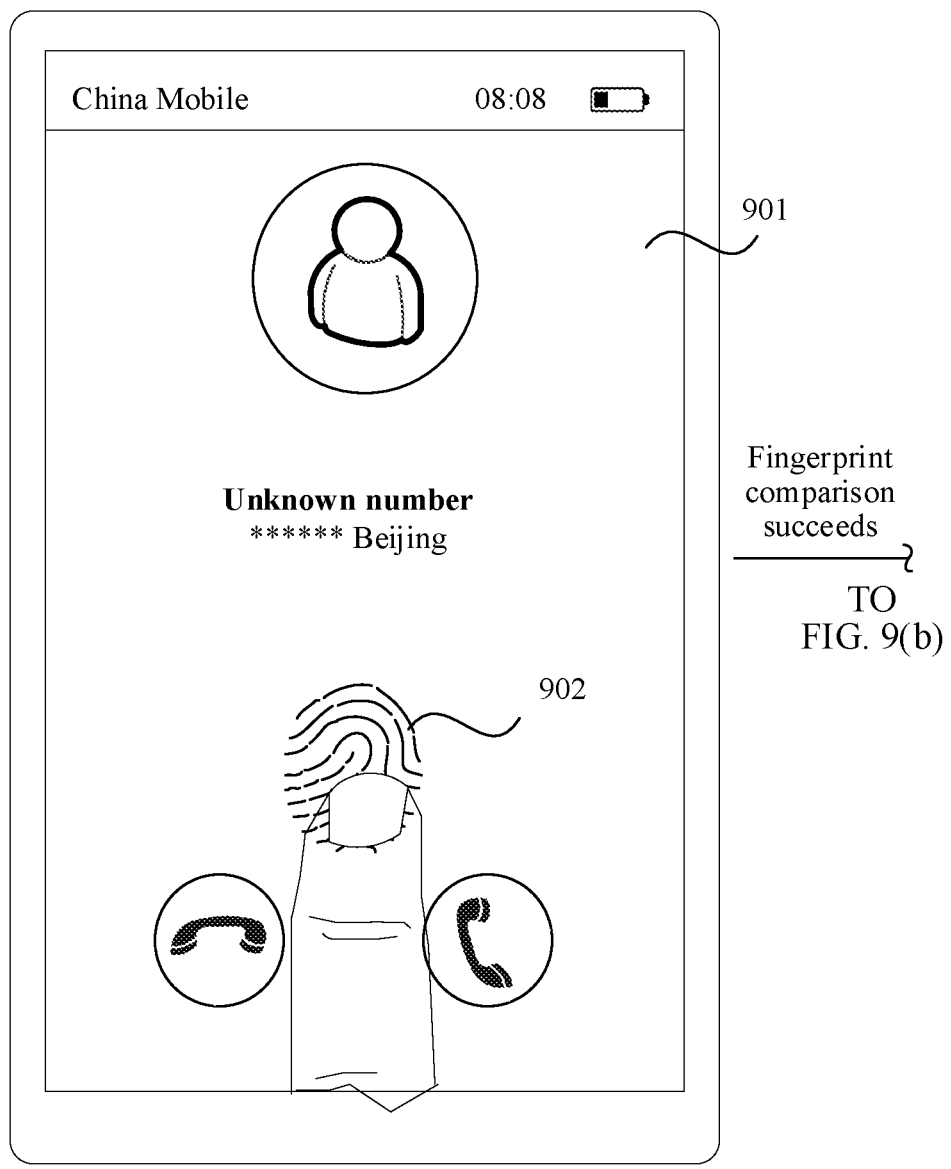
FIG. 9(a) and FIG. 9(b) are a schematic diagram of some graphical user interfaces displayed on a terminal according to some other embodiments of this application.

For example, when the terminal receives a new incoming call, on a screen of the new incoming call, for example, a screen 901 shown in FIG. 9(a), the terminal does not display a number of the new incoming call, but identifies the new incoming call as an "unknown number". In addition, the screen 901 further displays a fingerprint icon 902. The fingerprint icon 902 is used to prompt the user to enter fingerprint information, so that the terminal displays the content of the hidden information.

Figure 10A:
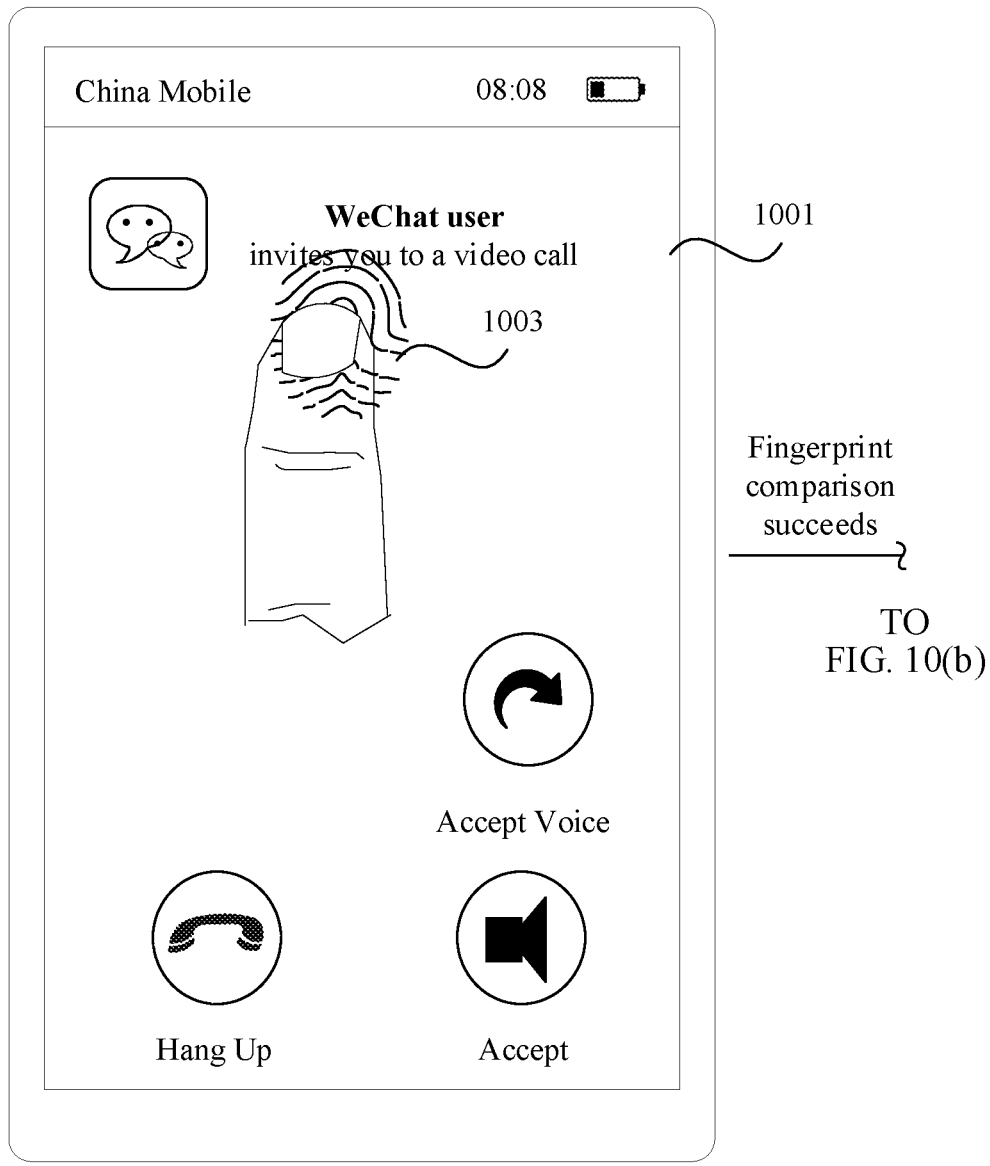
FIG. 10(a) and FIG. 10(b) are a schematic diagram of some graphical user interfaces displayed on a terminal according to some other embodiments of this application.

For another example, when the terminal receives a video call request sent by "WeChat", the terminal displays a screen 1001 shown in FIG. 10(a). On the screen 1001, the terminal does not display a WeChat name of a peer party, but identifies the WeChat name as a specific name, for example, "WeChat user", and does not display a WeChat avatar of the peer party, but displays a specific image, for example, a WeChat icon. In addition, the screen 1001 further displays a fingerprint icon 1003. The fingerprint icon 1003 is used to prompt the user to enter fingerprint information, so that the terminal displays the content of the hidden information.

In some examples of the embodiments of this application, when the terminal receives the communication request, the terminal may first determine whether the user has specified, for the communication request, that some information of the communication request needs to be hidden. If it is determined that the user has specified, for the communication request, that some information of the communication request needs to be hidden, when the terminal displays the screen existing when the call request is received, the fingerprint icon is displayed on the screen, to prompt the user to enter fingerprint information, so that the terminal displays the content of the hidden information. If it is determined that the user has not specified, for the communication request, that some information of the communication request needs to be hidden, when the terminal displays the screen existing when the call request is received, no fingerprint icon is displayed. This is not limited in this embodiment of this application.

In some other examples of the embodiments of this application, when the terminal receives the communication request, the terminal may first determine whether there is hidden information in the communication request, for example, whether a caller number is an unknown number. If there is hidden information in the communication request, when the terminal displays the screen existing when the call request is received, the fingerprint icon is displayed on the screen, to prompt the user to enter fingerprint information, so that the terminal displays content of the hidden information. If it is determined that there is no hidden information in the communication request, when the terminal displays the screen existing when the call request is received, no fingerprint icon is displayed. This is not limited in this embodiment of this application.

In some other examples of the embodiments of this application, when the terminal displays the screen existing when the call request is received, if some information of the communication request is hidden on the screen, for example, incoming call contact information is hidden, or the caller number is hidden, the terminal may display no answer control, or the terminal displays an answer control, but the control is inoperable. In other words, when the incoming call contact information is hidden, or the caller number is hidden, the terminal does not allow the user to answer the incoming call. After the terminal receives an operation of the user for displaying the hidden information, only when the terminal displays the incoming call contact information and the caller number, the terminal displays the answer control, or switches the inoperable answer control to an operable answer control, in other words, allows the user to answer the incoming call.

S202: The terminal receives an operation entered by the user for displaying the content of the hidden information of the call request.

The operation entered by the user for displaying the content of the hidden information of the call request may be, for example, an operation performed by the user at a fingerprint input location, and may be, for example, tapping, touching and holding, double-tapping, or sliding. This is not limited in this embodiment of this application.

Figures 9A, 9B:
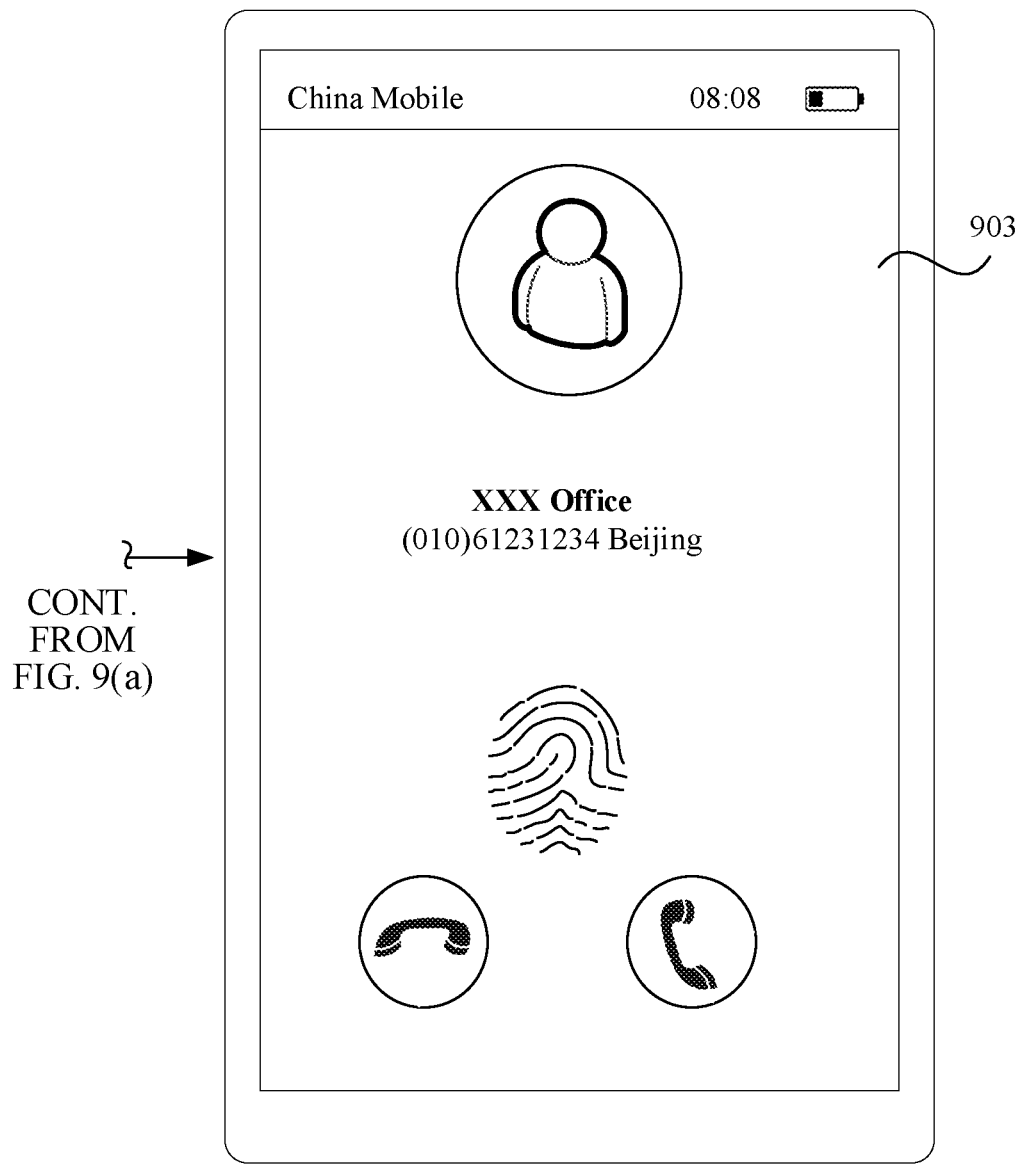
Figure 10B:
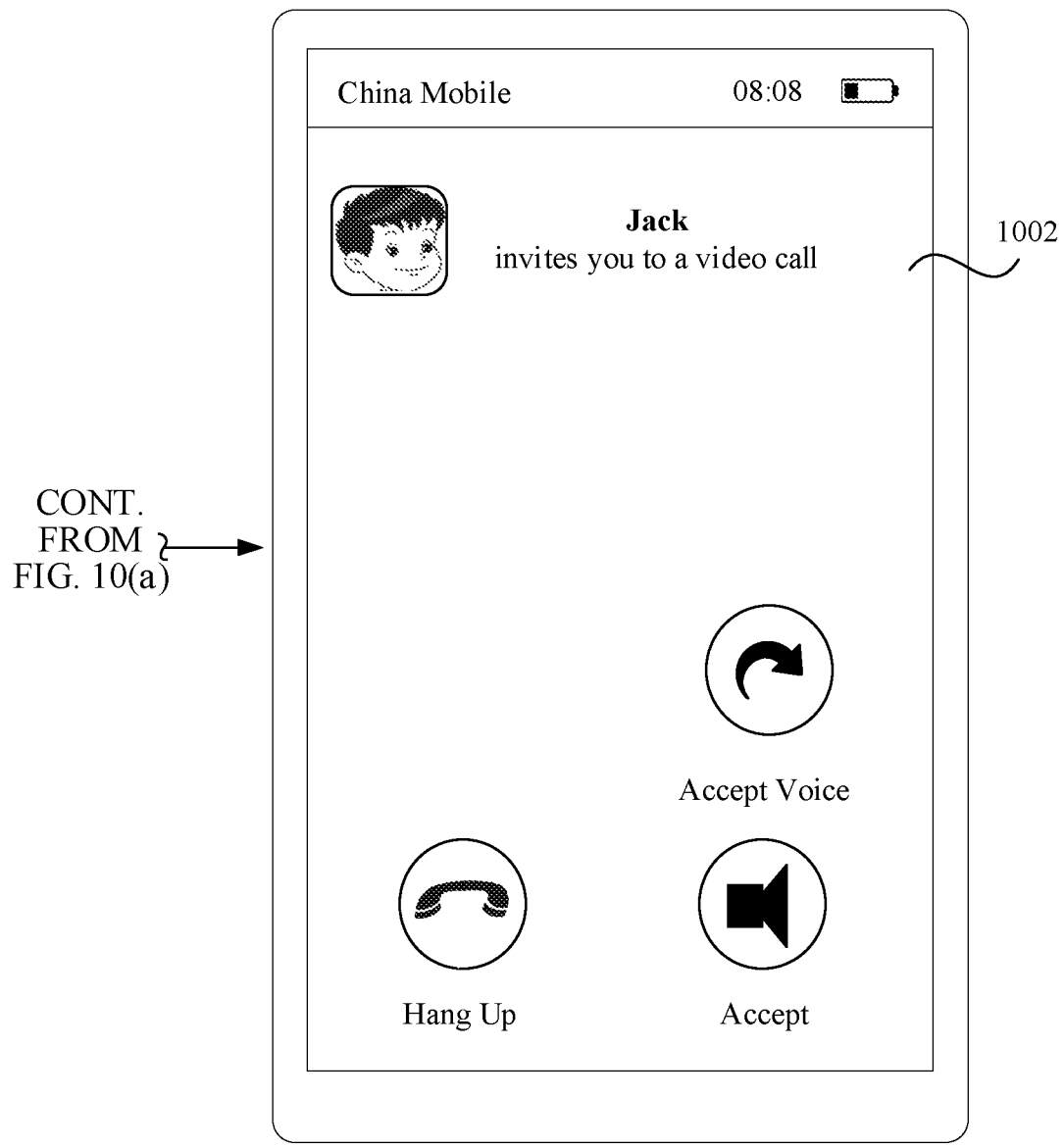

For example, as shown in FIG. 9(*a*), the operation may be an operation performed on the fingerprint icon 902, for example, tapping the fingerprint icon 902. For another example, as shown in FIG. 10(*a*), the operation may be an operation performed on the fingerprint icon 1003, for example, touching and holding the fingerprint icon 1003.

S203: The terminal displays the content of the hidden information of the call request in response to the operation entered by the user.

In some examples, the terminal obtains the fingerprint information of the user based on the operation entered by the user, and compares the obtained fingerprint information of the user with a pre-stored fingerprint template. If the fingerprint comparison succeeds, validity of an identity of the user can be confirmed, and the content of the hidden information of the call request is displayed.

For example, FIG. 9(*b*) shows a screen 903 displayed by the terminal after the fingerprint comparison succeeds. The screen 903 displays the content of the hidden information of the call request. For example, a remark name of the caller number is "XXX office", and the caller number is "(010) 61231234".

For another example, FIG. 10(*b*) shows a screen 1002 displayed by the terminal after the fingerprint comparison succeeds. The screen 1002 displays the content of the hidden information of the call request. For example, a video call inviter is "Jack", and an avatar of the video call inviter is also displayed.

In some other examples of this application, if the terminal detects an operation that the user instructs to answer the call, for example, the user taps an answer key, or the user slides an answer key, the terminal establishes a call connection, to support the call of the user. In some other examples of this application, to prevent an unauthorized user from randomly answering the call (including a voice call, a video call, or the like), and further prevent user privacy from being leaked, the terminal may also verify whether the user has permission to answer the call. For example, after detecting the operation that the user instructs to answer the call, the terminal may further prompt the user to enter fingerprint information again, so as to verify whether the user has answer permission. After determining that the user has the call answer permission, in other words, the user is an authorized user, the terminal establishes the call connection, to support the call of the user.

Figures 1, 8B:
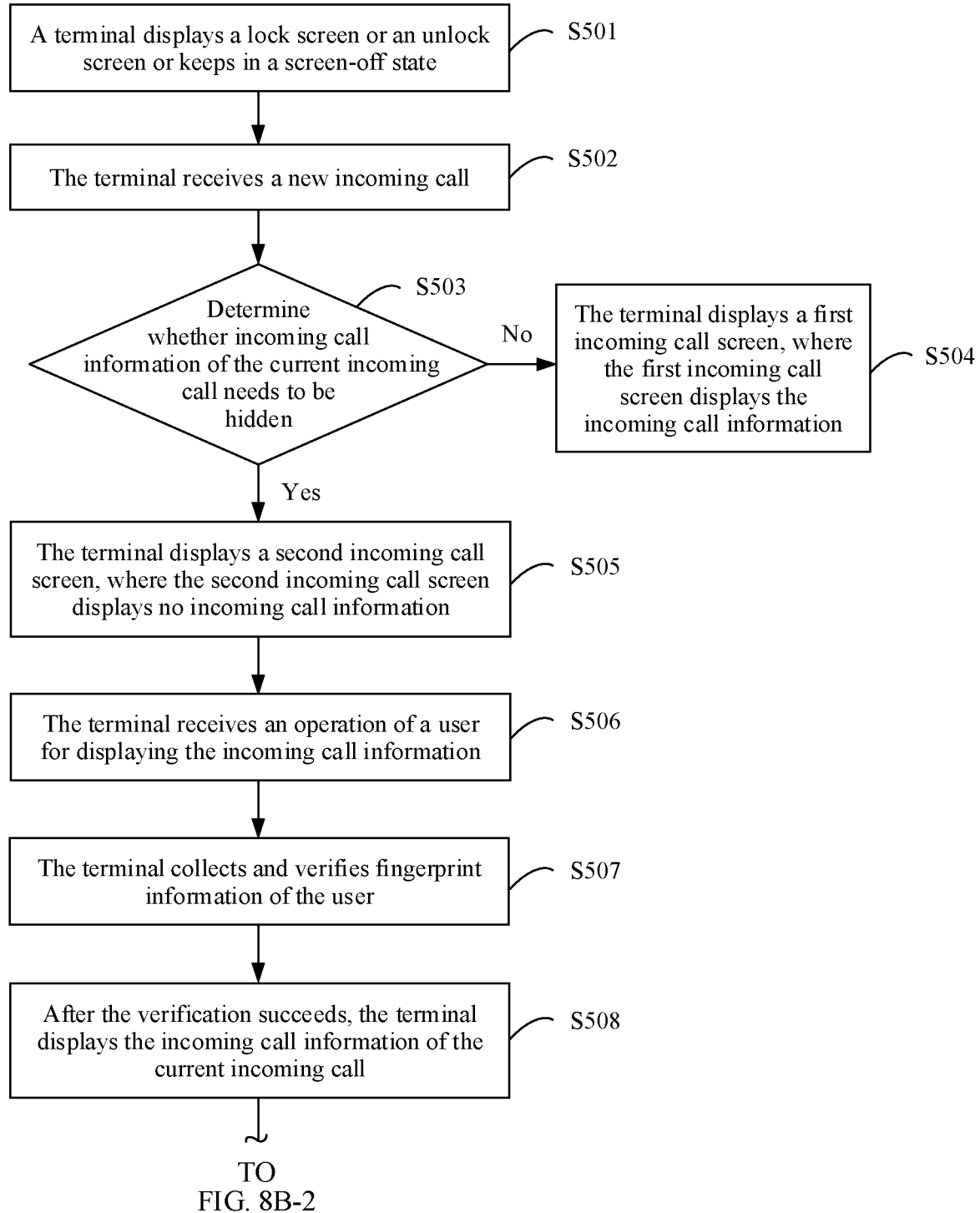
Figures 2, 8B:
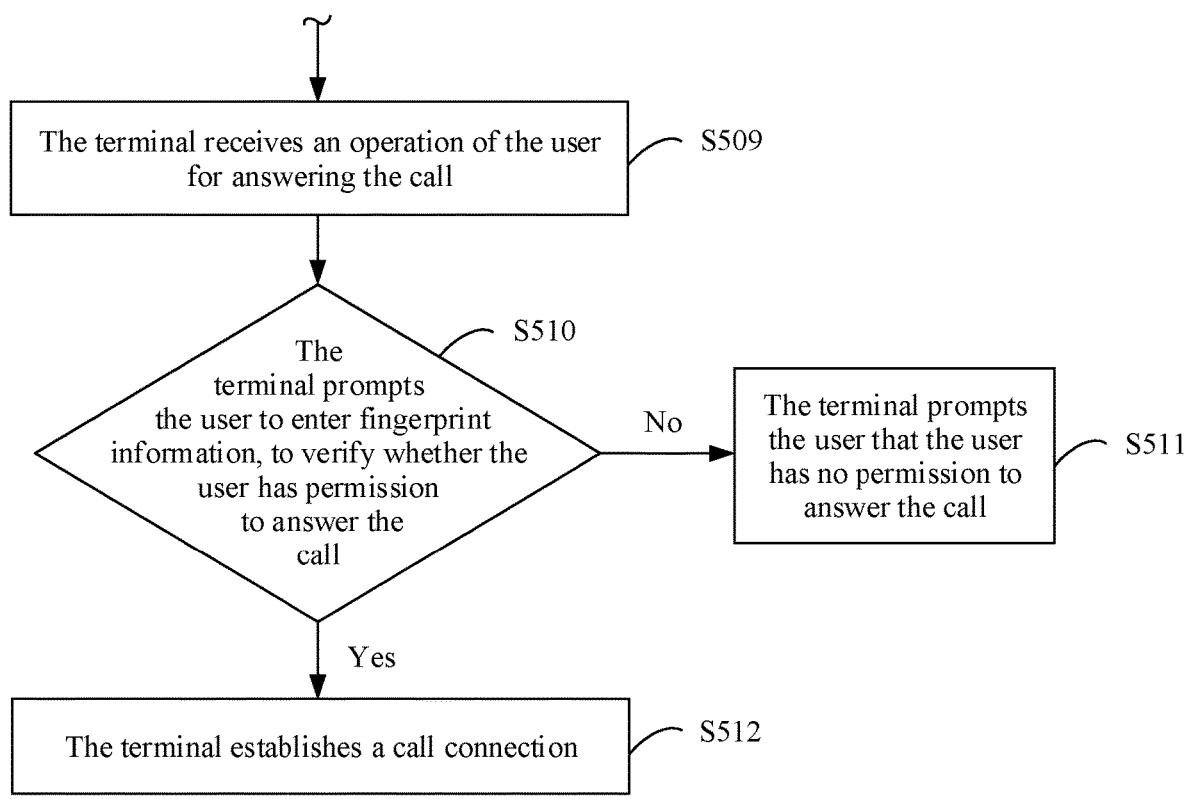

FIG. 8B-1 and FIG. 8B-2 are an example flowchart of a hidden call request content viewing method according to an embodiment of this application. The method specifically includes the following steps.

S501: A terminal displays a lock screen or an unlock screen or keeps in a screen-off state.

S502: The terminal receives a new incoming call.

The new incoming call may be a phone call, a voice call, a video call, or the like. This is not limited in this embodiment of this application.

S503: The terminal determines whether incoming call information of the current incoming call needs to be hidden. If the incoming call information of the current incoming call does not need to be hidden, step S504 is performed. If the incoming call information of the current incoming call needs to be hidden, step S505 is performed.

In some examples of this application, a user may specify whether to hide incoming call information and specify specific incoming call information that needs to be hidden. For example, the user may further set an application range in which incoming call information needs to be hidden, namely, specific applications whose incoming call information (for example, an incoming call of "phone services", a voice call and a video call of "WeChat", and a voice call and a video call of "QQ") needs to be hidden. The user may further set a contact whose incoming call information needs to be hidden, namely, specific contacts whose incoming call information needs to be hidden, or specific groups including contacts whose incoming call information needs to be hidden.

In some other examples of this application, the user may further set a time period, a location, or the like for hiding incoming call information, namely, a specific time period (incoming call information of an incoming call in the specific time period needs to be hidden, a specific location (incoming call information of an incoming call at the specific location needs to be hidden), or the like. An incoming call information hiding condition that is set by the user is not specifically limited in this embodiment of this application.

S504: The terminal displays a first incoming call screen, where the first incoming call screen displays the incoming call information.

The incoming call information includes a number of a calling party (which is referred to as a caller number for short), remark information corresponding to the caller number in contacts, an avatar corresponding to the caller number, and the like.

Then, step S509 may be performed.

S505: The terminal displays a second incoming call screen, where the second incoming call screen displays no incoming call information.

The second incoming call screen displays no incoming call information, and that no incoming call information is displayed includes that the incoming call information is not displayed, or may include that preset information is displayed instead of the incoming call information. For example, "unknown number" is displayed instead of remark information of a caller number, and a specific picture is displayed instead of an avatar corresponding to the caller number. This is not limited in this embodiment of this application. The incoming call information includes the caller number, the remark information corresponding to the caller number in contacts, the avatar corresponding to the caller number, and the like.

In some examples of this application, the terminal may further display a fingerprint icon, to prompt the user to enter fingerprint information, to view the hidden incoming call information. In some other examples of this application, the terminal may alternatively first determine whether there is hidden incoming call information. When it is determined that there is hidden incoming call information, the fingerprint icon is displayed to prompt the user. For details, refer to the description in step S201. Details are not described herein again.

S506: The terminal receives an operation of the user for displaying the incoming call information.

For example, the terminal receives an operation performed by the user on the fingerprint icon corresponding to the incoming call information, for example, an operation such as tapping, double-tapping, touching and holding, or sliding. The operation may be a preset operation for instructing the terminal to display the incoming call information.

S507: The terminal collects and verifies fingerprint information of the user.

S508: After the verification succeeds, the terminal displays the incoming call information of the current incoming call.

For example, after the verification succeeds, the terminal displays the hidden incoming call information of the current incoming call, for example, one or more of the caller number, the remark information corresponding to the caller number, and the avatar corresponding to the caller number.

After the verification succeeds, the fingerprint icon may be no longer displayed.

S509: The terminal receives an operation of the user for answering the call.

For example, the operation of the user for answering the call may be that, for example, the user taps an answer key, or the user slides an answer key to a specified location.

S510: The terminal prompts the user to enter fingerprint information, to verify whether the user has permission to answer the call. If it is verified that the user has no permission to answer the call, step S511 is performed; or if it is verified that the user has the permission to answer the call, step S512 is performed.

In this case, the fingerprint information that needs to be entered by the user may be the same as or different from the fingerprint information required in step S506. This is not limited in this embodiment of this application.

It should be noted that, the terminal may obtain the fingerprint information of the user from the operation of the user in step S506, to perform user identity verification. Therefore, step S510 may not be performed, and step S512 is directly performed.

S511: The terminal prompts the user that the user has no permission to answer the call.

S512: The terminal establishes a call connection.

For other content of this application scenario, refer to related content in the foregoing application scenarios. Details are not described herein again.

Application scenario 3: A terminal displays a screen of an application, the screen includes content of a plurality of items, and content of some items (which may be referred to as "hidden items") is set to a hidden state, for example, content of "to-do today" in "AI tips", or "flight information" in "AI tips".

Figure 11:
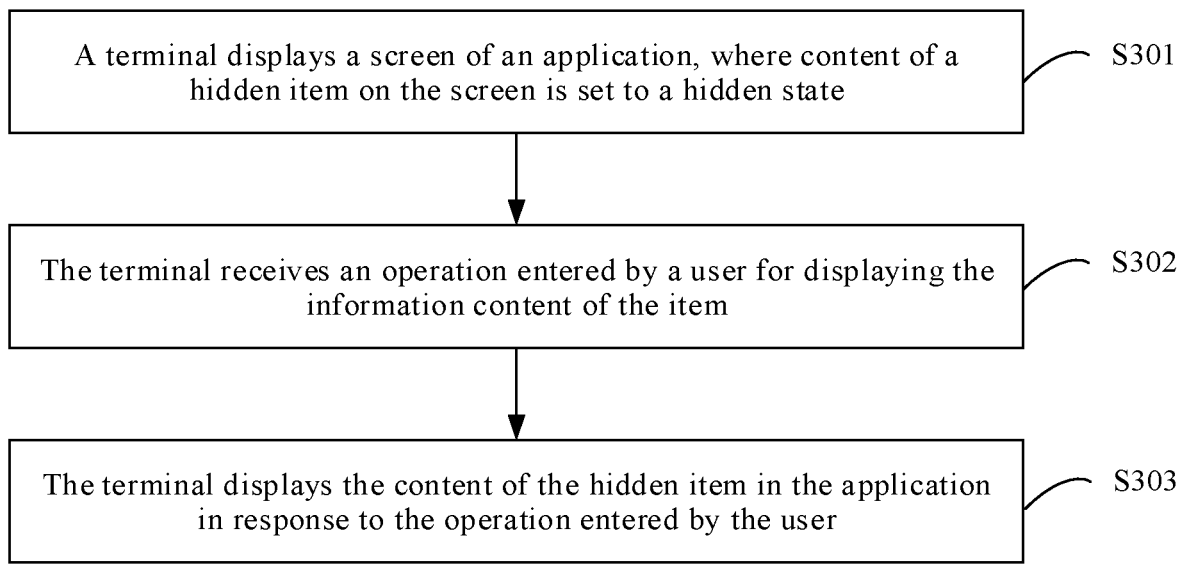
FIG. 11 is a schematic flowchart of an information content viewing method according to another embodiment of this application.

FIG. 11 is a flowchart of an information content viewing method according to an embodiment of this application. The method specifically includes the following steps.

S301: A terminal displays a screen of an application, where content of a hidden item on the screen is set to a hidden state.

In some examples, the application screen displayed by the terminal further displays a fingerprint icon, and the fingerprint icon corresponds to the application screen currently displayed by the terminal. The fingerprint icon is used to indicate that a user may enter fingerprint information, so that the terminal displays content of all hidden items in the application. A specific location of the fingerprint icon on the application screen is not limited in this embodiment of this application.

For example, "AI tips" is used as an example for description. In "AI tips", the terminal may actively extract user information such as SMS messages and calendars, and generate various scenario cards including flights, conferences, hotels, traffic, travel services, and the like, to help the user efficiently manage work and life. Each scenario card may be considered as one item in "AI tips". The user may set some privacy-related items to a private state. In this way, the terminal does not display content of the items on a screen of "AI tips".

Figure 12A:
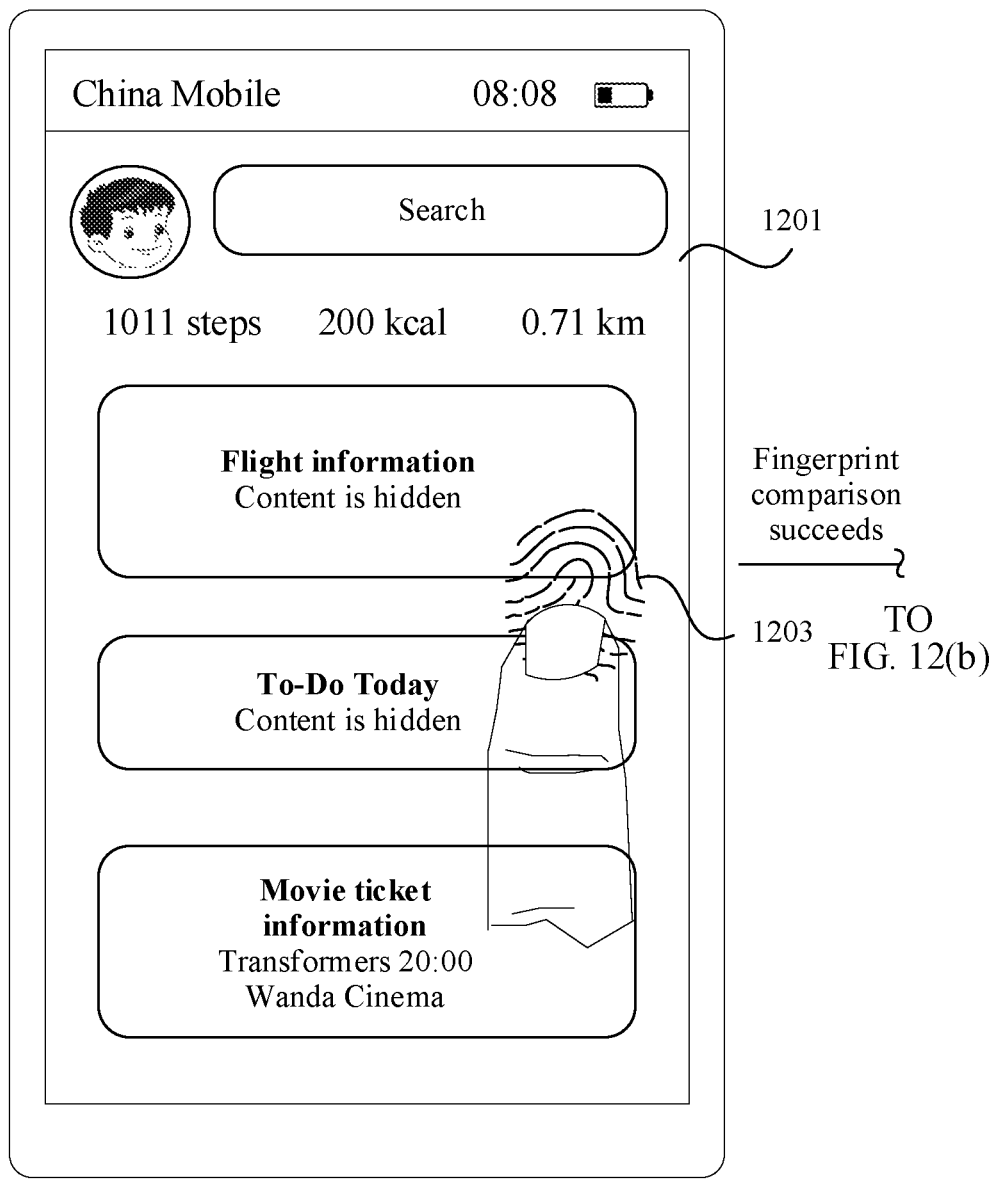
FIG. 12(a) and FIG. 12(b) are a schematic diagram of some graphical user interfaces displayed on a terminal according to some other embodiments of this application.

As shown in FIG. 12(a), content of "flight information" and "to-do today" is set to a hidden state on a screen 1201 of "AI tips". In addition, the screen 1201 further displays a fingerprint icon 1203. The fingerprint icon 1203 may be used to prompt the user to enter fingerprint information, to display content of all hidden items in "AI tips".

In some other examples of this application, on the application screen displayed by the terminal, each hidden item corresponds to one fingerprint icon. In other words, the fingerprint icon corresponding to each hidden item is used to prompt the user to enter fingerprint information, so that the terminal displays content of the hidden item. User fingerprint information that needs to be entered for the plurality of fingerprint icons may be the same or may be different. This is not limited in this embodiment of this application.

Figure 13A:
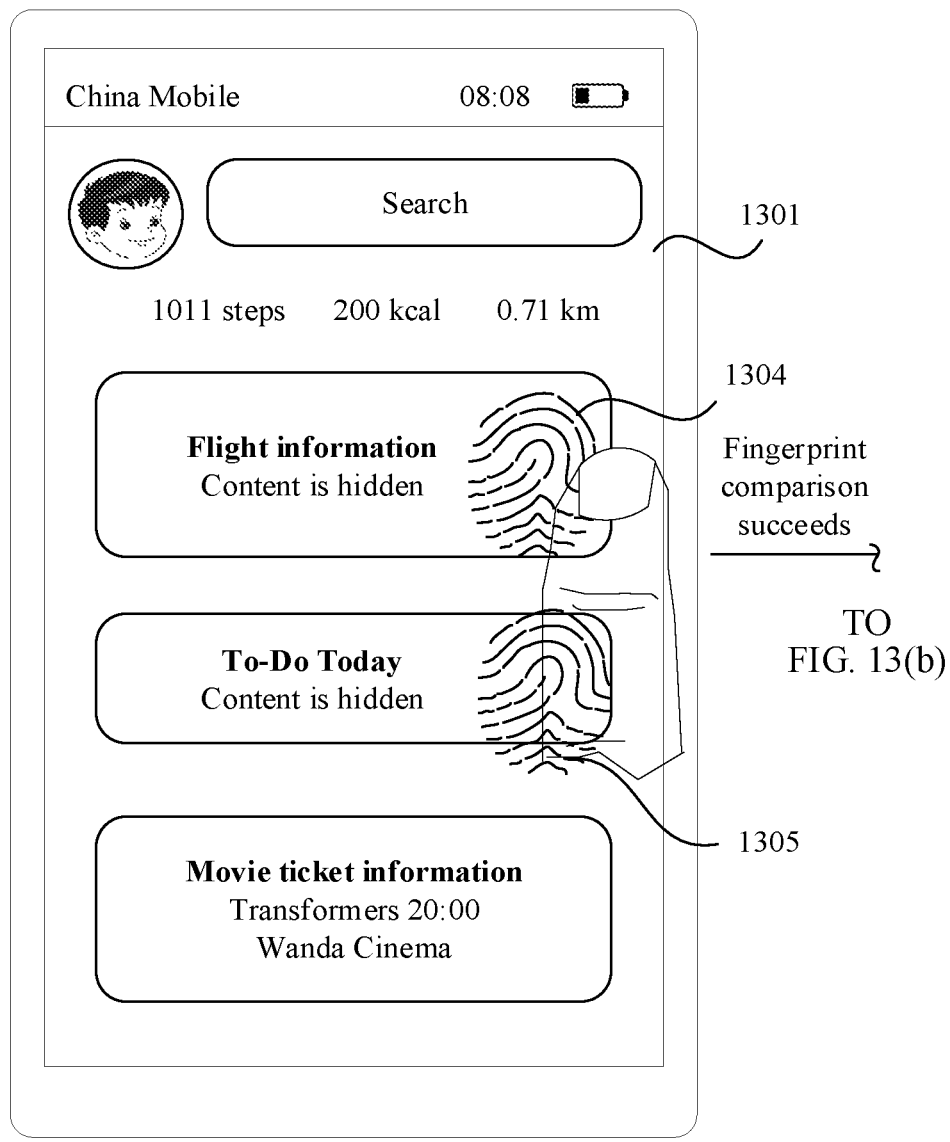
FIG. 13(a) to FIG. 13(c) are a schematic diagram of some graphical user interfaces displayed on a terminal according to some other embodiments of this application.

For example, "AI tips" is still used as an example for description. As shown in FIG. 13(a), content of "flight information" and "to-do today" is set to a hidden state on a screen 1301 of "AI tips". In addition, the screen 1301 further displays a plurality of fingerprint icons. For example, a fingerprint icon 1304 corresponds to "flight information", and is used to prompt the user to enter fingerprint information, to display content of the "flight information" item. A fingerprint icon 1305 corresponds to "to-do today", and is used to prompt the user to enter fingerprint information, to display content of the "to-do today" item.

In some other examples of this application, before displaying the screen of the application, the terminal may first determine whether there is an item whose content is hidden in the application, in other words, whether there is an item whose content is set to a hidden state. If it is determined that there is an item whose content is hidden in the application, a corresponding fingerprint icon is displayed. For example, one fingerprint icon may be displayed to correspond to the application. Alternatively, a plurality of fingerprint icons may be displayed to correspond to different items in the application. In some other examples of this application, the terminal may further determine whether there are one or more items that are set to a hidden state. If there is one item that is set to a hidden state, one fingerprint icon is displayed. If there are a plurality of items that are set to a hidden state, a plurality of fingerprint icons are displayed, and one item corresponds to one fingerprint icon. This is not specifically limited in this embodiment of this application.

S302: The terminal receives an operation entered by the user for displaying the information content of the item.

The operation is used to instruct the terminal to display the content of the hidden item, and may instruct the terminal to display the content of all the hidden items in the application, or may instruct the terminal to display content of a specific hidden item in the application. This is not specifically limited in this embodiment of this application. The operation may be an operation performed at a fingerprint input location (for example, a display location of a fingerprint icon), and for example, may be tapping, touching and holding, double-tapping, or sliding.

S303: The terminal displays the content of the hidden item in the application in response to the operation entered by the user.

In some examples, the terminal collects fingerprint information of the user based on the operation entered by the user, and compares the collected fingerprint information with a pre-stored fingerprint template. If the comparison succeeds, the content of the corresponding hidden item is displayed. If the comparison fails, the content of the corresponding hidden item is not displayed.

Figure 12B:
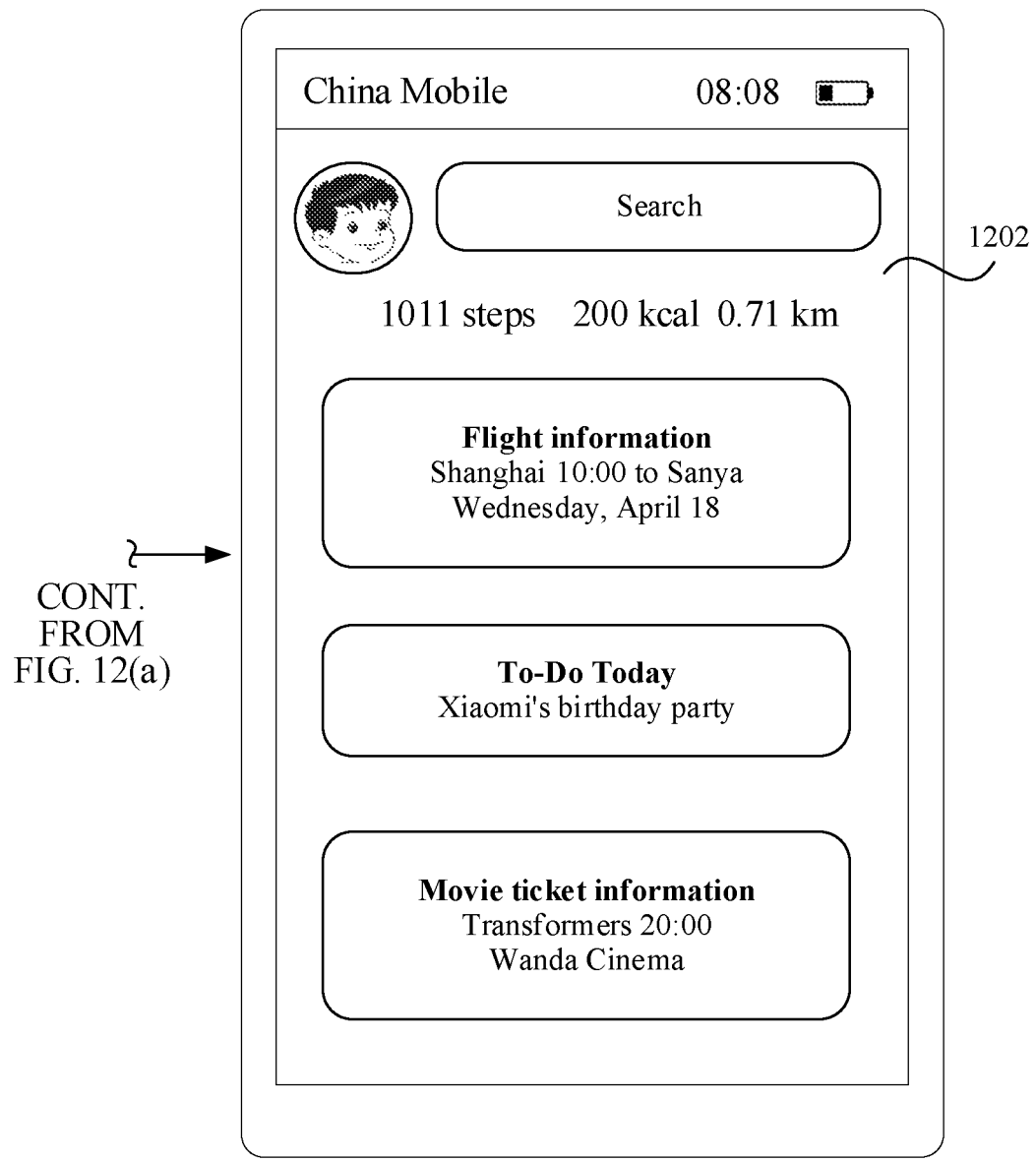

For example, the example of "AI tips" in step S302 is still used for description. On the screen 1201 shown in FIG. 12(a), the terminal detects an operation such as tapping performed by the user on the fingerprint icon 1203, and the terminal obtains fingerprint information of the user for comparison. After determining that the fingerprint information comparison succeeds, the terminal displays a screen 1202 shown in FIG. 12(b). The screen 1202 displays the content of the hidden item, for example, content of "flight information" and content of "to-do today". For example, an operation gesture of the user on the fingerprint icon 1203 may be further preset, and may be dragging the fingerprint icon 1203 to slide over the hidden item. In other words, the fingerprint icon 1203 is dragged to slide over "flight information" and "to-do today". When comparison between the fingerprint information of the user and the pre-stored fingerprint template succeeds, and an operation gesture of the user on the fingerprint icon 1203 is the preset gesture, the content of the hidden item, namely, the content of "flight information" and "to-do today", is displayed.

Figure 13B:
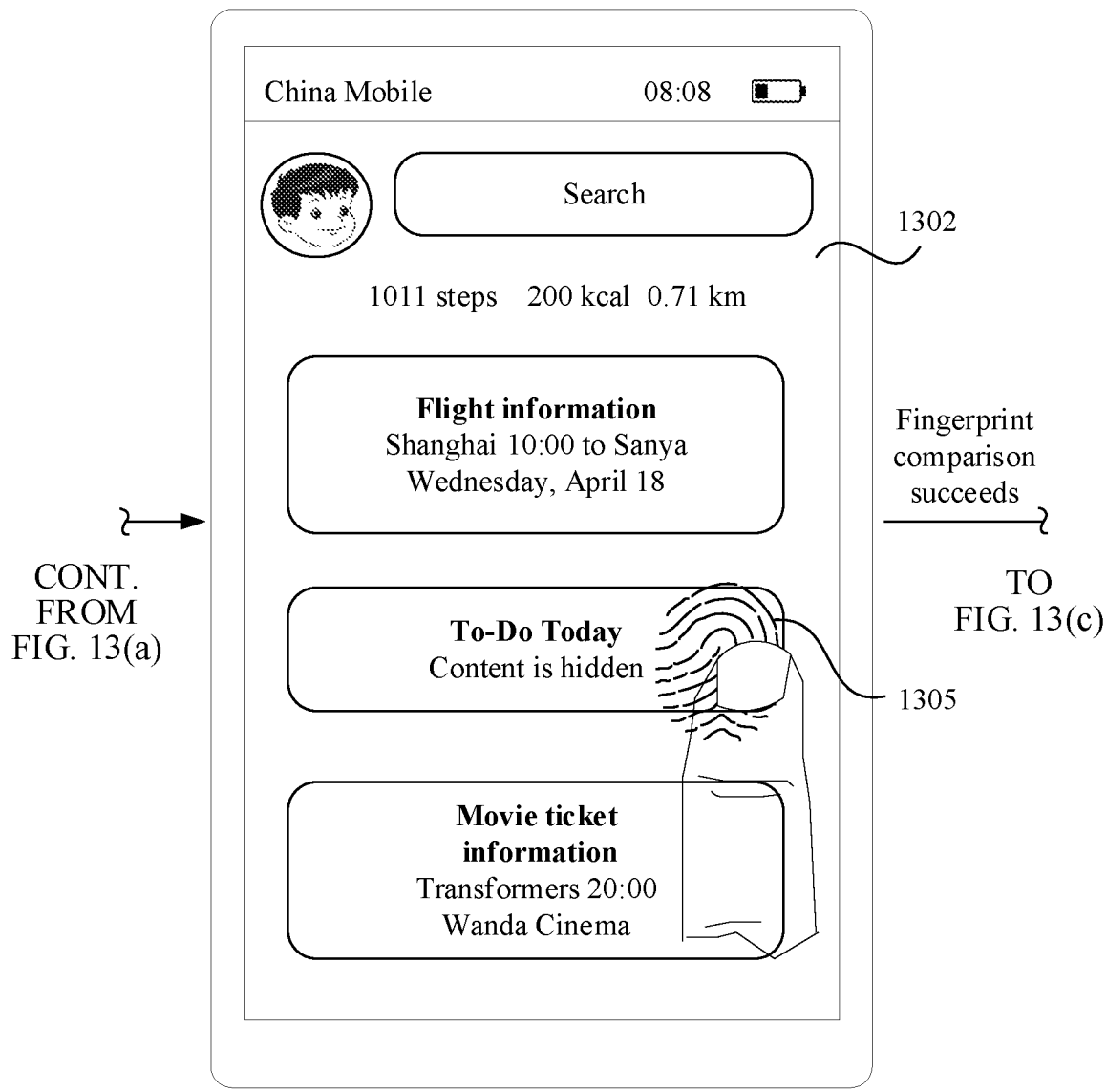
Figure 13C:
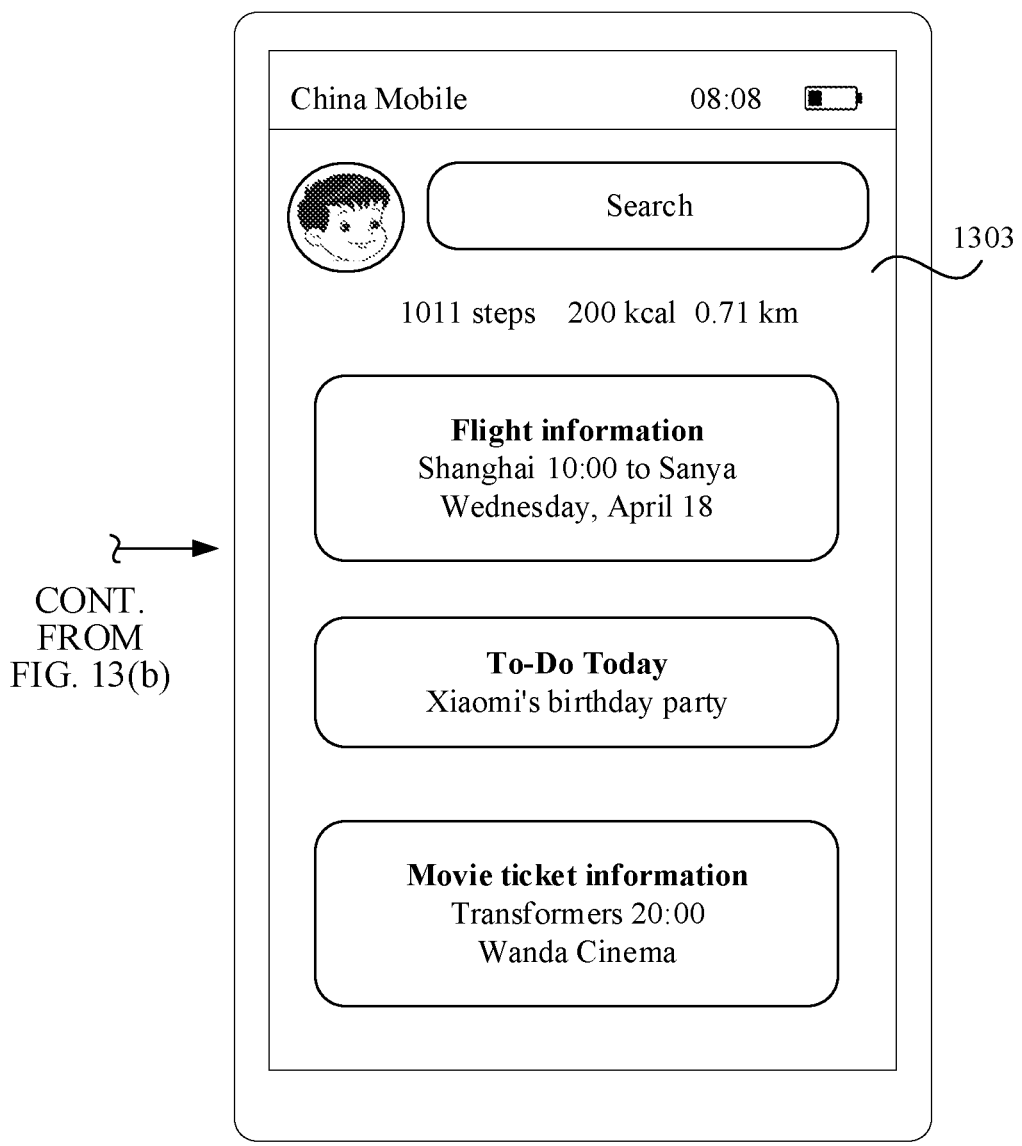

For another example, on the screen 1301 shown in FIG. 13(a), the terminal detects an operation such as tapping performed by the user on the fingerprint icon 1304 corresponding to one hidden item ("flight information"), and the terminal obtains fingerprint information of the user for comparison. After determining that the fingerprint information comparison succeeds, the terminal displays a screen 1302 shown in FIG. 13(b). The screen 1302 displays content of the hidden item ("flight information") corresponding to the fingerprint icon 1304, and content of the other hidden item ("to-do today") is still in a hidden state. Further, if the terminal detects, on the screen 1302, an operation such as tapping performed by the user on the fingerprint icon 1305 corresponding to the other hidden item ("to-do today"), the terminal displays a screen 1303 shown in FIG. 13(c). The screen 1303 displays the content of the hidden item ("to-do today") corresponding to the fingerprint icon 1305.

For other content of this application scenario, refer to related content in the foregoing application scenarios. Details are not described herein again.

Application scenario 4: A terminal displays a home screen. An application or a folder displayed on the home screen is set to an encrypted state.

It should be noted that after an application or a folder is set to an encrypted state, the terminal needs to verify an identity of a user, and only after the verification succeeds, the user is allowed to enter a screen of the application or enter a browsing screen of the folder. If the verification fails, the user is not allowed to enter a screen of the application or enter a browsing screen of the folder.

Figure 14A:
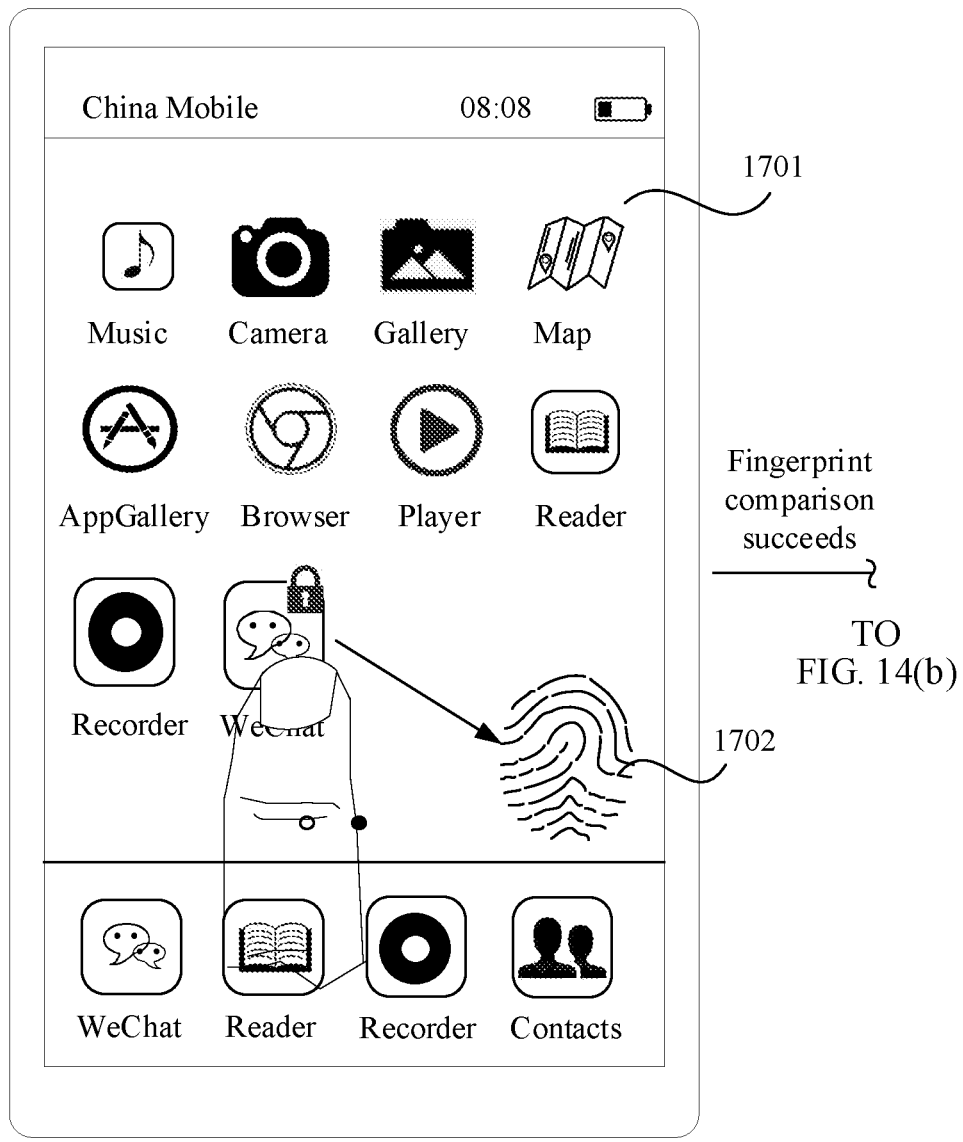
FIG. 14(a) and FIG. 14(b) are a schematic diagram of some graphical user interfaces displayed on a terminal according to some other embodiments of this application.

In some examples, the terminal may display an identifier, for example, a "lock" pattern, on an application icon or a folder icon, to identify that an application corresponding to the application icon or a folder corresponding to the folder icon is in an encrypted state. The identifier may be displayed at any location on the application icon. This is not limited in this embodiment of this application. On a screen 1701 shown in FIG. 14(a), a "lock" identifier is displayed at the upper right corner of "WeChat" icon, to identify that "WeChat" is an encrypted application. In some other examples, when an application is in different states, for example, an encrypted state or a non-encrypted state, the terminal displays a same application icon corresponding to the application. When a folder is in different states, for example, an encrypted state or a non-encrypted state, the terminal displays a same folder icon corresponding to the folder. In this case, for example, when the user taps an application icon, and enters an application screen corresponding to the application icon, an application corresponding to the application icon is in a non-encrypted state. For example, when the user taps an application icon, but the user cannot enter an application screen corresponding to the application icon, or the terminal displays prompt information to require the user to enter identity verification information, an application corresponding to the application icon is in an encrypted state. A case of a folder is similar, and details are not described.

In some examples, the home screen further displays a fingerprint icon, to indicate that the user may enter fingerprint information, so that the terminal verifies an identity of the user. The fingerprint icon may be at any location on the home screen. This is not limited in this embodiment of this application. In some other examples of this application, when displaying the home screen, the terminal may first determine whether an application or a folder on the home screen is in an encrypted state. If it is determined that an application or a folder on the home screen is in an encrypted state, the fingerprint icon is displayed; or if it is determined that no application or folder on the home screen is in an encrypted state, no fingerprint icon is displayed.

When the user detects an operation of the user for opening an encrypted application (or an encrypted folder), the terminal obtains fingerprint information of the user based on the operation, and compares the fingerprint information with pre-stored fingerprint information.

The operation of the user for opening the encryption application (or the encryption folder) may be an operation performed by the user at a fingerprint input location (for example, a display location of the fingerprint icon, or a display location of an application icon or a folder icon), and for example, may be tapping, touching and holding, or double-tapping. For example, the operation may be as follows: On the screen 1701 shown in FIG. 14(*a*), the user touches and holds an application icon corresponding to an encrypted application (for example, "WeChat"), and drags the application icon to a display location of the fingerprint icon 1702. For example, the operation may be alternatively that the user touches and holds an application icon corresponding to an encrypted application. This is not limited in this embodiment of this application.

Figure 14B:
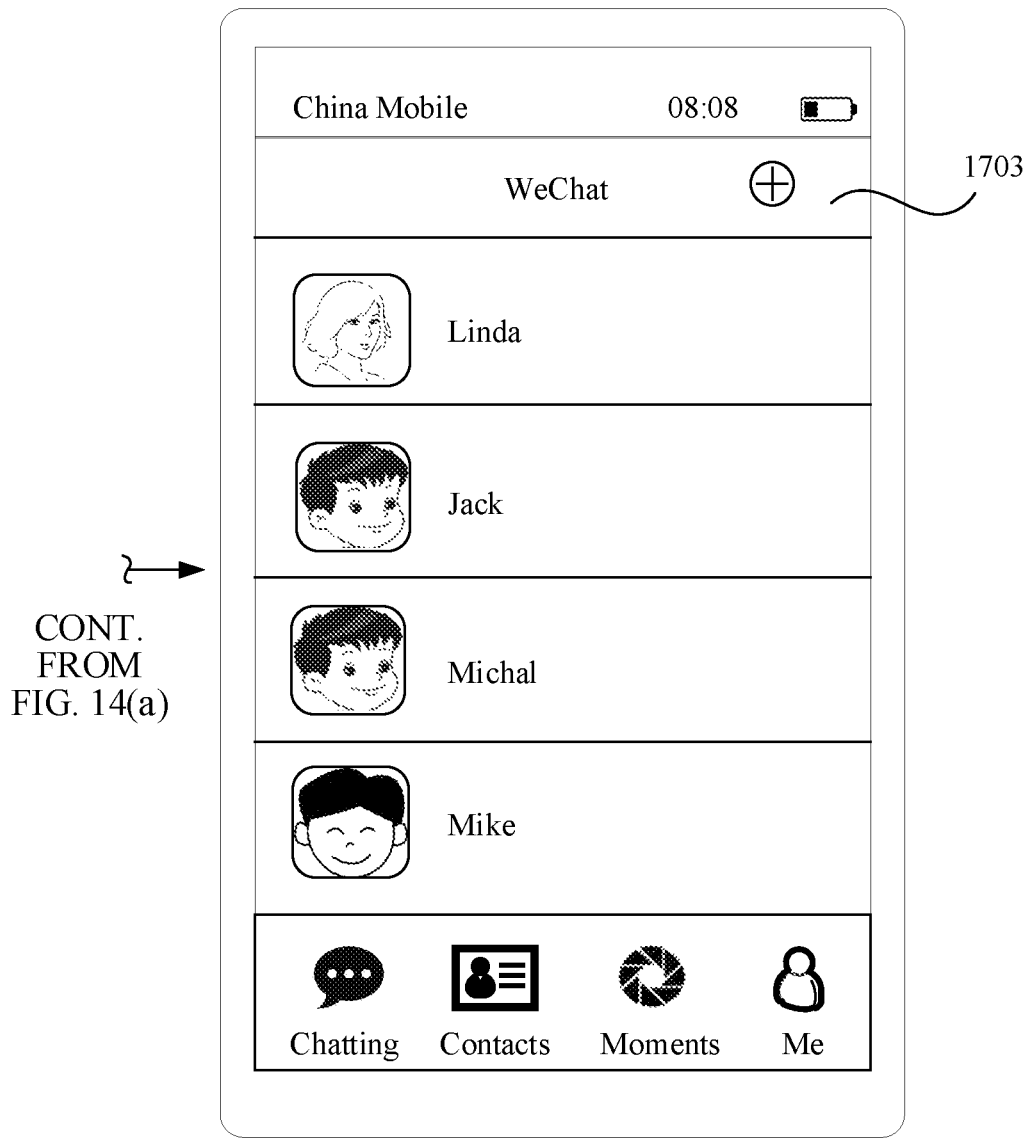

If comparison succeeds, user identity verification succeeds, and the terminal enters the screen of the application (or the browsing screen of the folder), for example, a screen 1703 shown in FIG. 14(*b*). In some embodiments of this application, after the fingerprint comparison succeeds, the terminal may further change a display effect of the fingerprint icon 1702, to prompt the user that the fingerprint comparison succeeds. For example, the fingerprint icon 1702 is changed from gray to another color, for example, red. For another example, before fingerprint comparison is performed, the fingerprint icon 1702 is statically displayed. After the fingerprint comparison succeeds, the fingerprint icon 1702 is dynamically displayed in a manner such as flashing or an animation effect. For still another example, brightness, contrast, grayscale, or the like of the fingerprint icon 1702 is changed. This is not limited in this embodiment of this application.

If comparison fails, user identity verification fails, and the terminal cannot enter the screen of the application (or the browsing screen of the folder). The terminal may display prompt information, to prompt the user that fingerprint input is incorrect. Alternatively, the terminal may prompt the user to re-enter fingerprint information, to perform user identity verification again. Optionally, the terminal may vibrate or change a color, grayscale, brightness, or the like of the fingerprint icon 203, to prompt the user that the fingerprint comparison fails. This is not limited in this embodiment of this application.

In some other examples of this application, if the terminal detects an operation of the user for opening the application (or an operation of the user for opening the folder), but collects no user identity verification information, the terminal may display prompt information, to prompt the user to enter fingerprint information, so as to perform user identity verification.

In some other examples of this application, if the comparison succeeds, the user identity verification succeeds. After the terminal enters the screen of the application, if the terminal detects an operation gesture entered by the user for closing the application, the terminal returns to the home screen or switches to another application screen, and still keeps the application to be in an encrypted state. Optionally, the terminal may alternatively keep the application to be in a decrypted state after the application exits running. In other words, when the user opens the application next time, the terminal no longer verifies a user identity for decryption.

Figure 15A:
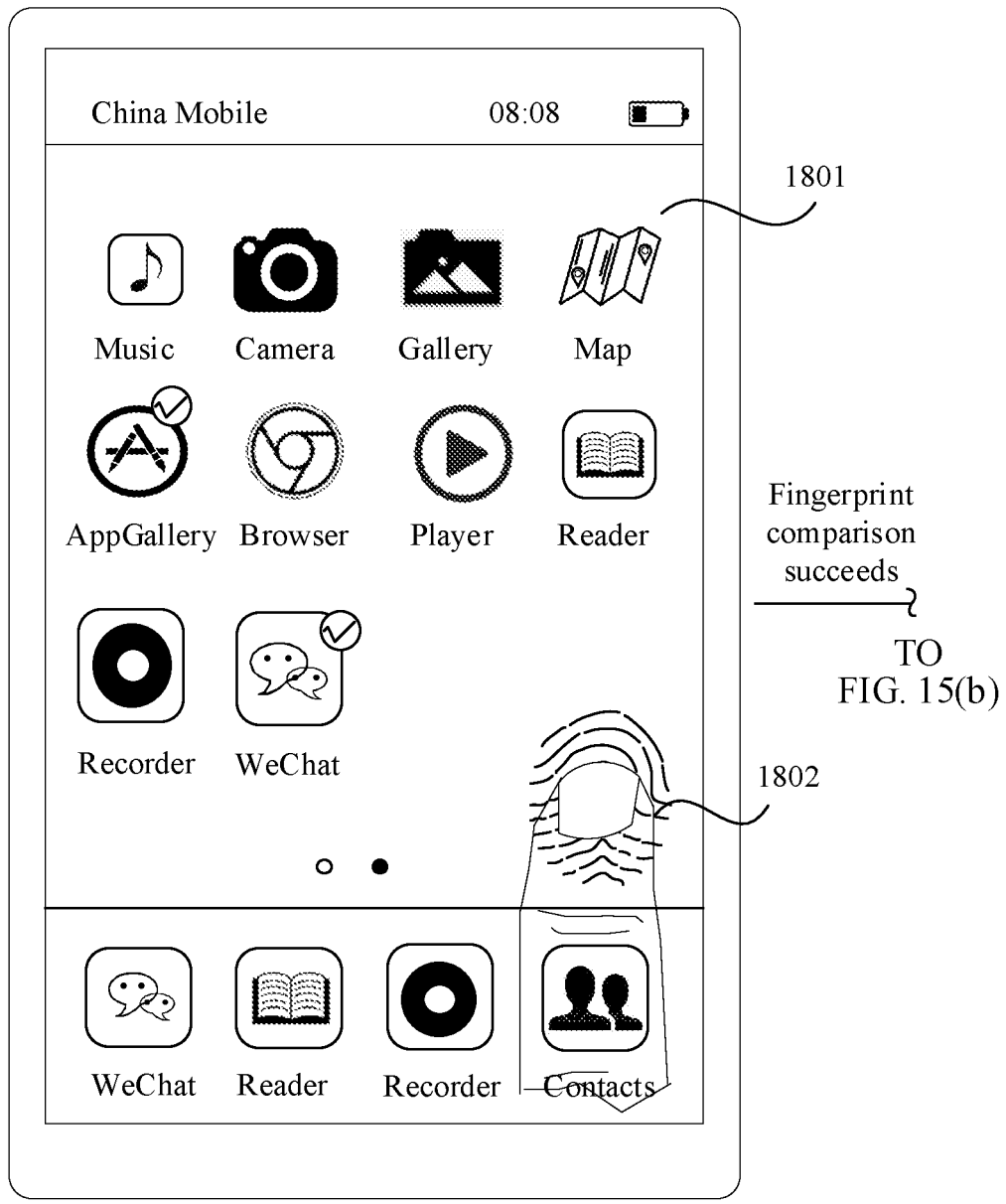
FIG. 15(a) and FIG. 15(b) are a schematic diagram of some graphical user interfaces displayed on a terminal according to some other embodiments of this application.
Figure 15B:
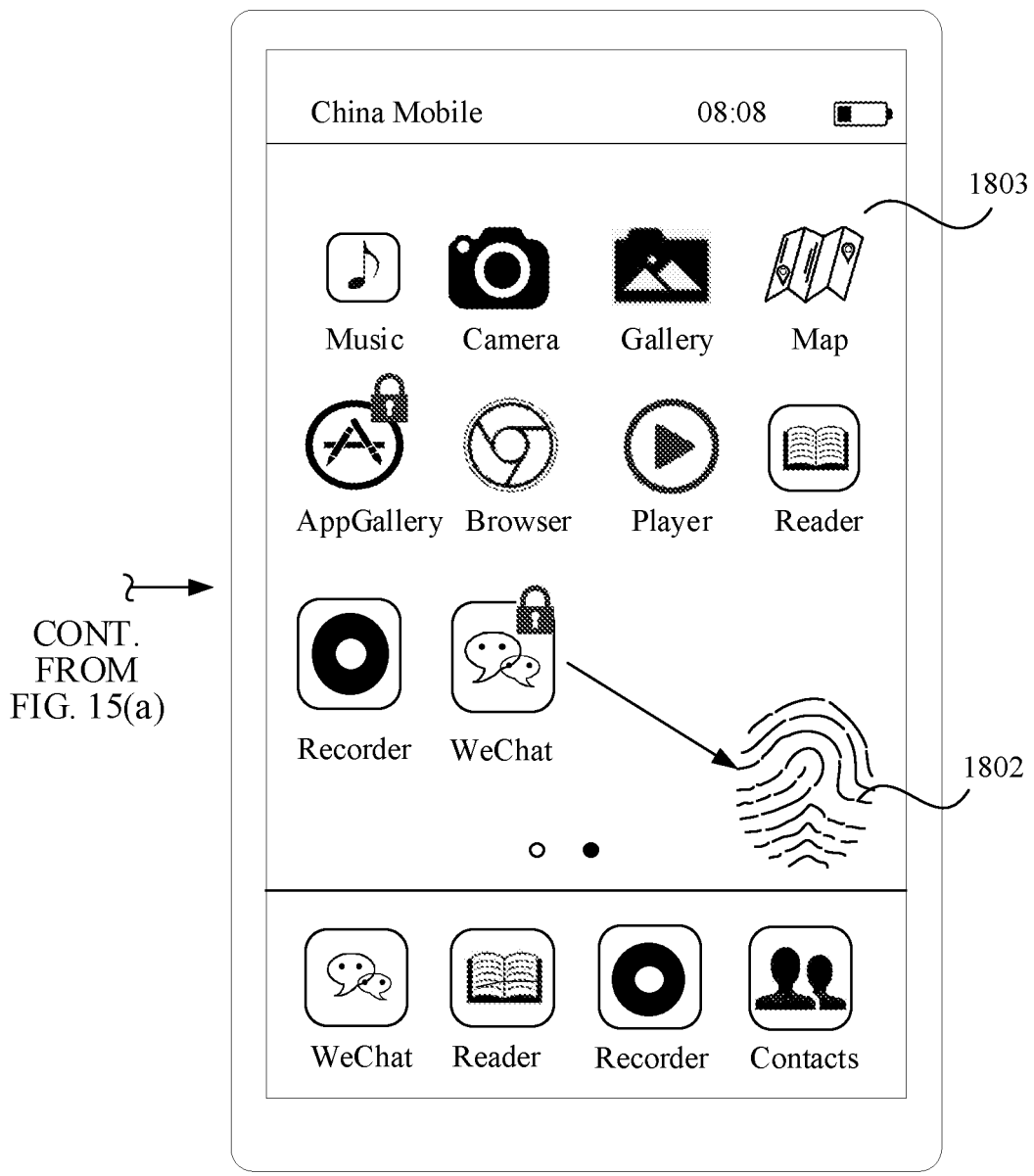

The method provided in the embodiments of this application further includes a process of encrypting an application or a folder, and the process is as follows:

In some examples of this application, as shown in FIG. 15(*a*) and FIG. 15(*b*), a terminal displays a home screen, and a user may enable the home screen to be editable by touching and holding any application icon on the home screen. For example, by using a tap operation, the user may select an application icon corresponding to an application that needs to be encrypted, or select a folder icon corresponding to a folder that needs to be encrypted. On a screen 1801 shown in FIG. 15(*a*), application icons of "AppGallery" and "WeChat" on the screen 1801 are selected.

In some examples, the home screen further displays a fingerprint icon 1802, to prompt the user to enter fingerprint information, to perform encryption processing on a selected application. The fingerprint icon 1802 may be at any location on the home screen. This is not limited in this embodiment of this application. The fingerprint icon 1802 and the fingerprint icon 1702 in FIG. 14(*a*) may be a same fingerprint icon, or may be different fingerprint icons. This is not limited in this embodiment of this application.

Then, the terminal detects an operation of the user for encrypting the application icon. The operation may be, for example, an operation performed by the user at a fingerprint input location (for example, a display location of the fingerprint icon, or a display location of the application icon or the folder icon), for example, an operation such as touching and holding, tapping, or double-tapping. The terminal obtains fingerprint information of the user based on the operation, and compares the obtained fingerprint information of the user with pre-stored fingerprint information.

If the comparison succeeds, the terminal encrypts the application corresponding to the selected application icon or the folder corresponding to the selected folder icon. In some embodiments of this application, after the fingerprint comparison succeeds, the terminal may further change a display effect of the fingerprint icon 1802, to prompt the user that the fingerprint comparison succeeds. For example, the fingerprint icon 1802 is changed from gray to another color, for example, red. For another example, before fingerprint comparison is performed, the fingerprint icon 1802 is statically displayed. After the fingerprint comparison succeeds, the fingerprint icon 1802 is dynamically displayed in a manner such as flashing or an animation effect. For still another example, brightness, contrast, grayscale, or the like of the fingerprint icon 1802 is changed. This is not limited in this embodiment of this application.

If the comparison fails, the terminal does not perform encryption processing. The terminal may display prompt information, to prompt the user that fingerprint input is incorrect. In some other examples of this application, the terminal may require the user to re-enter fingerprint information. After the user re-enters the fingerprint information, the terminal re-obtains the fingerprint information of the user, and re-compares the fingerprint information with the pre-stored fingerprint information. If the comparison succeeds, the terminal encrypts the application corresponding to the selected application icon or the folder corresponding to the selected folder icon. If the comparison fails, the terminal does not perform encryption processing.

In some other examples of this application, if the user encrypts an application or a folder on the home screen, the user may not need to first enter an editing state of the home screen and to select an application icon corresponding to the application or a folder icon corresponding to the folder. The user may directly touch and hold the application icon corresponding to the application or the folder icon corresponding to the folder on the home screen, and drag the application icon or the folder icon to a display location of the fingerprint icon 1802. In an entire process from touching and holding the application icon or the folder icon by the user to dragging the application icon or the folder icon by the user to the display location of the fingerprint icon 1802, a finger of the user does not leave a touchscreen. The terminal obtains fingerprint information of the user based on this operation, and compares the fingerprint information with pre-stored fingerprint information. If the comparison succeeds, the terminal encrypts the application corresponding to the application icon or the folder corresponding to the folder icon. If the comparison fails, the terminal does not perform encryption processing.

Optionally, the foregoing operation that the user touches and holds the application icon or the folder icon that needs to be hidden, and drags the application icon or the folder icon to the display location of the fingerprint icon 1802 may also be replaced with an operation that the user touches and holds the application icon or the folder icon that needs to be hidden. This is not specifically limited in this embodiment of this application.

It may be understood that the foregoing method in which the terminal encrypts and decrypts the application or a file on the home screen is also applicable to a case in which the terminal encrypts and decrypts an item in another application, for example, an SMS message, contact information, a folder, a picture file, a music file, a video file, and a file of another type. Details are not described in this embodiment of this application.

It can be understood that, to implement the foregoing functions, the terminal includes corresponding hardware structures and/or software modules for performing the functions. A person skilled in the art should easily be aware that, in combination with the examples described in the embodiments disclosed in this specification, units and algorithm steps can be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, the terminal and the like may be divided into function modules based on the foregoing method examples. For example, function modules corresponding to the functions may be obtained through division, or two or more functions may be integrated into one processing module. The integrated module may be implemented in a form of hardware, or may be implemented in a form of a software function module. It should be noted that, in the embodiments of the present invention, division into modules is an example, and is merely logical function division. In actual implementation, there may be another division manner.

Figure 16:
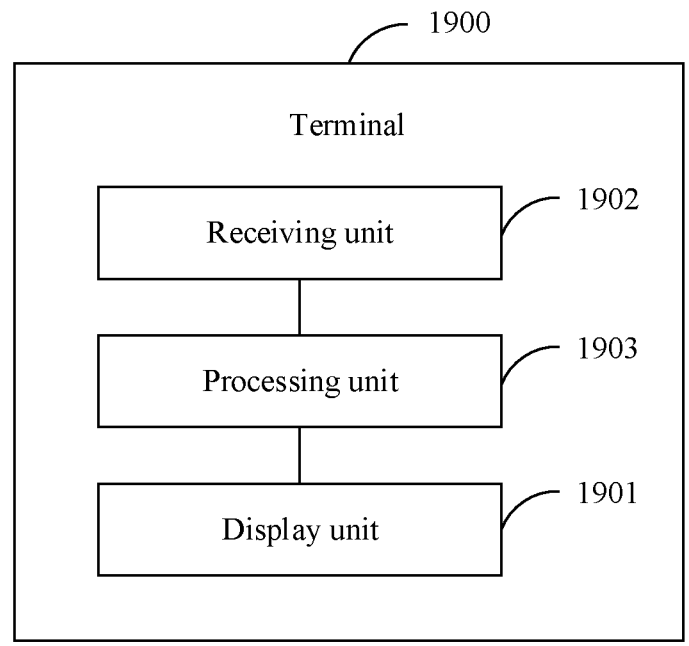
FIG. 16 is a schematic structural diagram 2 of a terminal according to this application.

When the function modules corresponding to the functions are obtained through division, FIG. 16 is a schematic diagram of a possible structure of the terminal in the foregoing embodiments. As shown in FIG. 16, the terminal 1900 includes a display unit 1901, a receiving unit 1902, and a processing unit 1903.

The display unit 1901 is configured to support the terminal in displaying the first screen in S101, the second screen in S103, and the third screen in S105 that are in FIG. 7A, the lock screen in S401, the prompt information in S404, the screen in S405, and the screen in S408 that are in FIG. 7B, the screen in S201 and the screen in S203 that are in FIG. 8A, the screen in S501, the first incoming call screen in S504, the second incoming call screen in S505, the screen in S508, the screen in S510, and the screen in S511 that are in FIG. 8B-1 and FIG. 8B-2, the screen in S301 and the screen in S303 that are in FIG. 11, and the screens shown in FIG. 2 to FIG. 6, FIG. 9, FIG. 10, and FIG. 12 to FIG. 15 in the foregoing method embodiments, and/or performing another process of the technology described in this specification.

The receiving unit 1902 is configured to support the terminal in performing S102 and S104 in FIG. 7A, S402 and S406 in FIG. 7B, S202 in FIG. 8A, S502, S506, and S509 in FIG. 8B-1 and FIG. 8B-2, S302 in FIG. 11, and/or another process of the technology described in this specification.

The processing unit 1903 is configured to support the terminal in performing S403 and S407 in FIG. 7B, S503, S507, and S512 in FIG. 8B-1 and FIG. 8B-2, and/or another process of the technology described in this specification.

All related content of the steps in the foregoing method embodiments may be cited in function descriptions of the corresponding function modules. Details are not described herein again.

Certainly, the terminal 1900 may further include but is not limited to the foregoing listed unit modules. For example, the terminal 1900 may further include a storage unit, configured to store a program, data, and the like of the terminal. In addition, functions that can be specifically implemented by the function units include but are not limited to functions corresponding to the method steps in the foregoing embodiments. For a detailed description of another unit of the terminal 1900, refer to the detailed description of the method step corresponding to the unit. Details are not described in this embodiment of this application.

When an integrated unit is used, the display unit 1901 may be a display module, for example, a touchscreen. The processing unit 1903 may be a processing module of the terminal. The receiving unit 1902 may be a communications module of the terminal, for example, an RF circuit, a Wi-Fi module, or a Bluetooth module. The storage unit may be a storage module of the terminal.

Figure 17:
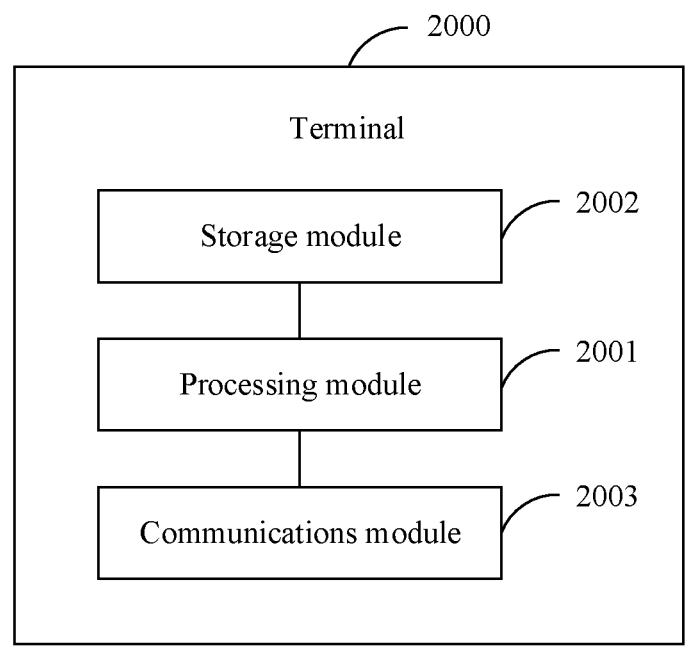
FIG. 17 is a schematic structural diagram 3 of a terminal according to this application.

FIG. 17 is a schematic diagram of a possible structure of the terminal in the foregoing embodiments. The terminal 2000 includes a processing module 2001, a storage module 2002, and a communications module 2003. The processing module 2001 is configured to control and manage an action of the terminal. The storage module 2002 is configured to store program code and data of the terminal. The communications module 2003 is configured to communicate with another terminal. The processing module 2001 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 2001 may implement or execute various example logical blocks, modules, and circuits described with reference to content disclosed in the present invention. The processor may be a combination of processors implementing a computing function, for example, a combination of one or more microprocessors, or a combination of a DSP and a microprocessor. The communications module 1303 may be a transceiver, a transceiver circuit, a communications interface, or the like. The storage module 2002 may be a memory.

When the processing module 2001 is a processor (the processor 101 shown in FIG. 1), the communications module 2003 is an RF transceiver circuit (the radio frequency circuit 102 shown in FIG. 1), and the storage module 2002 is a memory (the memory 103 shown in FIG. 1), the terminal provided in this embodiment of this application may be the terminal 100 in FIG. 1. The communications module 2003 may include an RF circuit, and may further include a Wi-Fi module and a Bluetooth module. The communications module such as the RF circuit, the Wi-Fi module, and the Bluetooth module may be collectively referred to as a communications interface. The processor, the communications interface, and the memory may be coupled together by using a bus.

The foregoing descriptions about implementations allow a person skilled in the art to clearly understand that, for the purpose of convenient and brief description, only division into the foregoing function modules is taken as an example for illustration. In actual application, the foregoing functions can be allocated to different function modules for implementation based on a requirement. To be specific, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the division into the modules or units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:
1. A method, comprising:
  displaying a first lock screen or maintaining a screen-off state;
  receiving first information of a first application, second information of a second application, and third information of the first application;
  displaying a second lock screen, wherein the second lock screen displays a first control, a second control, a third control, a first fingerprint icon corresponding to the first control and the third control, and a second fingerprint icon corresponding to the second control, wherein the first control indicates that first content of the first information is hidden, wherein the second control indicates that second content of the second information is hidden, and wherein the third control indicates that third content of the third information is hidden;
  receiving a first operation of a user on the first fingerprint icon, wherein the first operation is for displaying the first content and the third content;
  collecting, in response to the first operation, first fingerprint information of the user by using a first fingerprint sensor corresponding to the first fingerprint icon, wherein the first fingerprint sensor is disposed on a touchscreen of a terminal;
  performing a first verification on the first fingerprint information;
  displaying, in response to the first fingerprint information being successfully verified, a third lock screen, wherein the third lock screen displays the first content in the first control, displays the third content in the third control, and does not display the second content of the second information;
  receiving a second operation of the user on the second fingerprint icon, wherein the second operation is for displaying the second content;

collecting, in response to the second operation, second fingerprint information of the user by using a second fingerprint sensor corresponding to the second fingerprint icon, wherein the second fingerprint sensor is disposed on the touchscreen;

performing a second verification on the second fingerprint information; and displaying, in response to the second fingerprint information being successfully verified, a fourth lock screen, wherein the fourth lock screen displays the second content in the second control.

2. The method of claim 1, wherein the first control indicates that the first content is hidden by either:

displaying preset content instead of the first content, wherein the preset content is different from the first content; or displaying a message indicating that the first content is hidden.

3. The method of claim 1, wherein displaying the second lock screen comprises displaying the second lock screen when the first information meets a preset condition, and wherein the preset condition comprises that the first information is from a preset application, a sending party of the first information is a preset contact, the first information is received within a preset time period, or the first information is received at a preset location.

4. The method of claim 1, wherein a first display location of the first fingerprint icon partially overlaps a second display location of the first control, wherein the first fingerprint sensor is disposed at the first display location, wherein the first operation is received at the first display location, and wherein the first fingerprint information is collected by using the first fingerprint sensor at the first display location.

5. The method of claim 4, wherein a third display location of the second fingerprint icon partially overlaps a fourth display location of the second control, and wherein the second fingerprint sensor is disposed at the third display location.

6. The method of claim 5, wherein the first display location partially overlaps a fifth display location of the third control.

7. The method of claim 1, wherein the first content comprises:

at least one of a sender name, a sender number, or message content of the first information when the first information is a short message service (SMS) message or an instant messaging application message; and a caller name or a caller number of a missed call when the first information is a missed call notification.

8. The method of claim 1, wherein displaying the second lock screen comprises displaying the second lock screen when the first information meets a preset condition, and wherein the preset condition comprises that the first information is from a preset application.

9. The method of claim 1, wherein displaying the second lock screen comprises displaying the second lock screen when the first information meets a preset condition, and wherein the preset condition comprises that a sending party of the first information is a preset contact.

10. The method of claim 1, wherein displaying the second lock screen comprises displaying the second lock screen when the first information meets a preset condition, and wherein the preset condition comprises that the first information is received within a preset time period.

11. The method of claim 1, wherein displaying the second lock screen comprises displaying the second lock screen when the first information meets a preset condition, and wherein the preset condition comprises that the first information is received at a preset location.

12. A computer program product comprising instructions stored on a non-transitory computer-readable medium that, when executed by one or more processors, cause an apparatus to:

display a first lock screen on a touchscreen of the apparatus;

receive first information of a first application, second information of a second application, and third information of a third application;

display, in response to receiving the first information, the second information, and the third information, a second lock screen on the touchscreen, wherein the second lock screen comprises a first control, a second control, a third control, a first fingerprint icon corresponding to the first control and the third control, and a second fingerprint icon corresponding to the second control, wherein the first control indicates that first content of the first information is hidden, wherein the second control indicates that second content of the second information is hidden, and wherein the third control indicates that third content of the third information is hidden;

receive a first operation of a user on the first fingerprint icon, wherein the first operation is for displaying the first content and the third content;

collect, in response to the first operation, first fingerprint information of the user by using a fingerprint sensor corresponding to the first fingerprint icon;

perform a first verification on the first fingerprint information;

display, in response to the first fingerprint information being successfully verified, a third lock screen on the touchscreen, wherein the third lock screen displays the first content in the first control, displays the third content in the third control, and does not display the second content of the second information;

receive a second operation of the user on the second fingerprint icon, wherein the second operation is for displaying the second content;

collect, in response to the second operation, second fingerprint information of the user by using a second fingerprint sensor corresponding to the second fingerprint icon;

perform a second verification on the second fingerprint information; and display, in response to the second fingerprint information being successfully verified, a fourth lock screen, wherein the fourth lock screen displays the second content in the second control.

13. The computer program product of claim 12, wherein a first display location of the first fingerprint icon partially overlaps a second display location of the first control, and wherein a first fingerprint sensor is disposed at the first display location.

14. The computer program product of claim 13, wherein a third display location of the second fingerprint icon partially overlaps a fourth display location of the second control, and wherein the second fingerprint sensor is disposed at the third display location.

15. The computer program product of claim 14, wherein the first display location partially overlaps a fifth display location of the third control.

16. The computer program product of claim 12, wherein the first content comprises:

at least one of a sender name, a sender number, or message content of the first information when the first information is a short message service (SMS) message or an instant messaging application message; and
a caller name or a caller number of a missed call when the first information is a missed call notification.

17. An apparatus, A terminal comprising:
a touchscreen;
a first fingerprint sensor disposed on the touchscreen;
a second fingerprint sensor disposed on the touchscreen; and
one or more processors coupled to the touchscreen, the first fingerprint sensor, and the second fingerprint sensor and configured to:
display a first lock screen or maintain a screen-off state;
receive first information of a first application, second information of a second application, and third information of the first application;
display a second lock screen, wherein the second lock screen displays a first control, a second control, a third control, a first fingerprint icon corresponding to the first control and a second fingerprint icon corresponding to the second control, wherein the first control indicates that first content of the first information is hidden, wherein the second control indicates that second content of the second information is hidden, and wherein the third control indicates that third content of the third information is hidden;
receive a first operation of a user on the first fingerprint icon, wherein the first operation is for displaying the first content and the third content;
collect, in response to the first operation, first fingerprint information of the user by using the first fingerprint sensor corresponding to the first fingerprint icon;
perform a first verification on the first fingerprint information;
display, in response to the first fingerprint information being successfully verified, a third lock screen, wherein the third lock screen displays the first content in the first control, displays the third content in the third control, and does not display the second content of the second information;
receive a second operation of the user on the second fingerprint icon, wherein the second operation instructs is for displaying the second content;
collect, in response to the second operation, second fingerprint information of the user by using the second fingerprint sensor corresponding to the second fingerprint icon;
perform a second verification on the second fingerprint information; and
display, in response to the second fingerprint information being successfully verified, a fourth lock screen, wherein the fourth lock screen displays the second content in the second control.

18. The apparatus of claim 17, wherein the first control indicates that the first content is hidden by either:
displaying preset content instead of the first content, wherein the preset content is different from the first content; or
displaying a message indicating that the first content is hidden.

19. The apparatus of claim 17, wherein the one or more processors are further configured to display the second lock screen when the first information, that the first information meets a preset condition, and wherein the preset condition comprises that the first information is from a preset application, a sending party of the first information is a preset contact, the first information is received within a preset time period, or the first information is received at a preset location.

20. The apparatus of claim 17, wherein a first display location of the first fingerprint icon partially overlaps a second display location of the first control, wherein the first fingerprint sensor is disposed at the first display location, wherein the first operation is received at the first display location, and wherein the first fingerprint information is collected by using the first fingerprint sensor at the first display location.

* * * * *

UNITED STATES PATENT AND TRADEMARK OFFICE
CERTIFICATE OF CORRECTION

PATENT NO. : 11,934,505 B2
APPLICATION NO. : 17/889803
DATED : March 19, 2024
INVENTOR(S) : Zhan Li and Changkuan Chen It is certified that error appears in the above-identified patent and that said Letters Patent is hereby corrected as shown below:

In the Claims

Claim 19, Column 40, Lines 25-26: "first information, that the first information meets a preset" should read "first information meets a preset"

Signed and Sealed this
Thirtieth Day of April, 2024

Katherine Kelly Vidal
*Director of the United States Patent and Trademark Office*